United States Patent [19]

Hempleman et al.

[11] Patent Number: 5,038,316

[45] Date of Patent: Aug. 6, 1991

[54] METHOD FOR GENERATING USER DOCUMENTATION FOR AN APPLICATION PROGRAM BY EXECUTING COMMANDS ASSOCIATED WITH DIFFERENT ASPECTS OF THE APPLICATION PROGRAM IN RESPONSE TO ANALYSIS OF THE APPLICATION PROGRAM

[75] Inventors: James D. Hempleman, 1660 N. LaSalle, Chicago, Ill. 60614; Carl F. Freeland, Crystal Lake; Paul A. Philip, Algonquin; Edward F. Adasiewicz, Crystal Lake; Jamie L. Curcio, Barrington; Paul J. Stinchfield, Des Plaines; Patricia A. Huetteman, Chicago, all of Ill.

[73] Assignee: James D. Hempleman, Chicago, Ill.

[21] Appl. No.: 235,451

[22] Filed: Aug. 22, 1988

[51] Int. Cl.⁵ .............................................. G06F 3/00
[52] U.S. Cl. .............................. 364/900; 364/943.5; 364/419
[58] Field of Search ............... 364/200, 900, 519, 521, 364/419; 400/63, 76, 83

[56] References Cited

U.S. PATENT DOCUMENTS

| | | | |
|---|---|---|---|
| 4,370,707 | 1/1983 | Philips et al. | 364/200 |
| 4,441,829 | 4/1984 | Hebert, Jr. et al. | 400/63 |
| 4,445,795 | 5/1984 | Levine et al. | 400/63 |
| 4,470,129 | 9/1984 | Disbrow et al. | 364/900 |
| 4,553,860 | 11/1985 | Imaizumi et al. | 400/68 |
| 4,730,252 | 3/1988 | Bradshaw | 364/900 |
| 4,800,485 | 1/1989 | Ackroff et al. | 364/200 |
| 4,860,203 | 8/1989 | Corrigan et al. | 364/300 |

OTHER PUBLICATIONS

Theisen, "Program Documentation Aid Method", IBM TDB vol. 20, No. 11B, Apr. 1978, pp. 4840-4841.
Parrott, "Computer Program Documentation", IBM TDB vol. 24, No. 12, May, 1982, p. 6540.
"Method for Computer Generation of Interface Wiring Diagrams and Associated Engineering Documentation", IBM TDB vol. 28, No. 1, Jun. 1985, pp. 344-345.

*Primary Examiner*—Thomas C. Lee
*Attorney, Agent, or Firm*—Goldsmith, Shore, Sutker & Milnamow, Ltd. Dressler

[57] ABSTRACT

A method of automatically generating user documentation includes the steps of providing a file of tables that defines, at least in part, the software system; providing a file of text and commands that defines the desired documentation; providing a documentation output file; examining each entry of the text and command file and, determining if an entry is a command. Each command is executed. Any required output is generated. At least some of the generated output is stored in the output file. If an entry is text, the text is inserted into the output file.

7 Claims, 31 Drawing Sheets

IF FILE FORMAT

FIG. 21          EF FILE FORMAT

METHOD FOR GENERATING USER DOCUMENTATION FOR AN APPLICATION PROGRAM BY EXECUTING COMMANDS ASSOCIATED WITH DIFFERENT ASPECTS OF THE APPLICATION PROGRAM IN RESPONSE TO ANALYSIS OF THE APPLICATION PROGRAM

FIELD OF THE INVENTION

The invention pertains to the field of automatic documentation generation in connection with computer software. More particularly, the invention pertains to a system and method of generating user documentation for applications packages based on high level languages.

BACKGROUND OF THE INVENTION

During the last 10-15 years, the volume of software that has been generated in the United States and the rest of the world has been enormous. This growth in software has in part been fed by the proliferation of relatively inexpensive, high performance, personal computer systems. Many of these computers have, by standards of only a few years ago, very large random access memories. As a result, very complex, sophisticated languages and application programs are now available for use with desk-top computers.

Along with this explosion in software there has been an enormously increased need for accurate, and timely user documentation. The need for accurate and timely user documentation is exacerbated by the fact that the majority of users of these sophisticated and complex application programs are not programmers or analysts but are business persons.

Today's user, as a result of the wholesale proliferation of personal computer systems, on average knows less about the operation of his or her computer system and the related software than at any other time. Hence, such users need accurate and timely user documentation more than ever.

The present need for accurate and timely user documentation must be viewed against a relatively long-term failure of the data processing industry to effectively deal with the documentation problem. It has been estimated that 90% of the world's computer software is undocumented. Further, it has been estimated that the existing documentation for the other 10% is out of date.

The problem, it is generally agreed, has evolved from not only the high cost of producing accurate and timely documentation manually but also due to a lack of interest on the part of many programmers and analysts in preparing documentation. This lack of interest is in part due to the orientation and training of such individuals.

However, this lack of interest is also in part due to a long-term and ongoing shortage of such individuals in the market place. As a result, most qualified programmers and analysts usually are very busy attempting to meet deadlines for new systems or attempting to keep existing systems running in a satisfactory fashion.

Thus, there is now and there has been a need for a system and a method which make it possible to create user documentation without taking valuable time from the existing programmers and analyst. Further, such system and method should be relatively automatic and not require large amounts of manual input. That system and method should also be cost effective in terms of computer resources required and run time needed to produce the documentation.

User education is one of the largest problems in the development of computer systems today. Minimizing the time required to learn how to operate computer systems is crucial. If a system is difficult to learn, its value is diminished and the cost to operate the system is increased.

The problem is further compounded by high employee turnover in today's fast-paced business world. When an employee resigns he or she takes the detailed knowledge of their job. This is especially true for users of computer systems. New replacement employees often take months (and even years) to become as productive as the prior worker.

This dilemma has caused corporate management to look for new innovative training methods. In the computer field, this has often led to the development of Tutorial systems. To date these are mock-ups of the computer screens and processes. The Tutorial consists of sample screens that must simulate the operation of the actual system.

This has two major problems:

First, the development of simulated Tutorials is extremely time-consuming. Since each detail of the system must be re-created, the process is tedious and extremely expensive. It often takes as much as 8 hours for a specially trained individual to re-create a single screen.

Second, any modifications to the system (no matter how minor) must be reflected in the Tutorial. Since computer systems are continually enhanced to meet changing requirements, this is a major problem. The result causes the ongoing costs of maintaining Tutorials to skyrocket.

Thus, there is a continuing need to provide user assistance information on screens while an application is being executed. The development of such displayable information can be time consuming and expensive. There is thus a need for software tools which ease the development of such displays.

SUMMARY OF THE INVENTION

In accordance with the invention, both a system and method are provided for generating user documentation. The system includes circuitry and disk drives for storing files of tables that define an application package. The system also includes circuitry and disk drives for storing one or more files of text and commands which define the desired documentation as well as capacity for storing a documentation output file.

Control circuitry, coupled to the storage circuitry and disk drives, examines each entry of the text and command file and determines if an entry is a command or not. Circuitry is provided for executing each command and for generating any required output character strings including any necessary text. Finally, circuitry is provided for determining if an entry in the text and command file is only text which is then stored in the output file.

Printers or display terminals can be provided for printing selected contents of the output file or for displaying selected of those contents as needed.

Further, in accordance with the invention, a method is provided of creating documentation for a user. The method includes using a file of tables that defines, at least in part, the application package. A file of text and commands that defines the desired documentation is provided. A documentation output file is also provided.

Each entry of the text and command file is examined. If an entry is a command, it is executed. Any output required by that command is generated. At least some of the generated output is stored in the output file. If an entry is text, that text can be skipped or stored in the output file. The contents of the output file can be listed to provide hard copy documentation.

As yet another aspect of the invention, tools and a method are provided for the development of user assistance overlays on displayed screens. In accordance with this method, a data structure is provided by an application developer which includes user assistance text information linked to at least one of the displayable screens. A plurality of user assistance records can be provided. Each record is linked to the next record. As various screens are displayed, the corresponding user assistance text information is provided by overlaying a region of the displayed screen.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
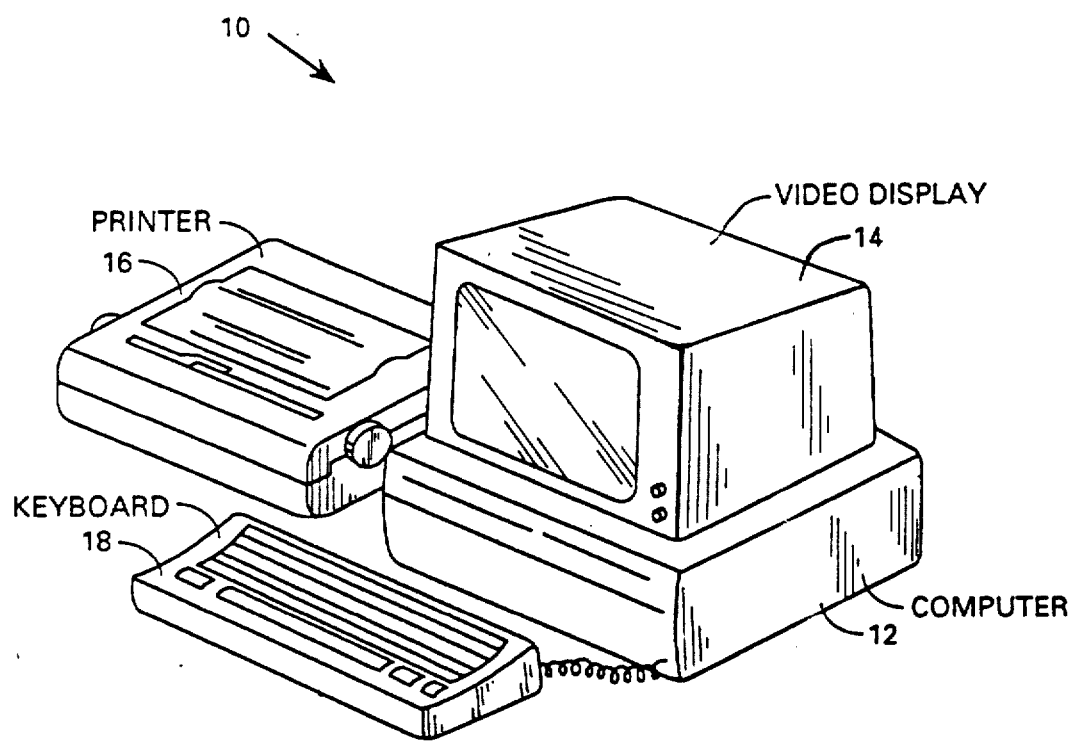
FIG. 1 is a pictorial diagram of a computer system usable in carrying out the method of the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

The present invention pertains to a method and system of automatically generating user documentation. In a preferred embodiment it is implemented using a stored program digital computer to execute a predetermined documentation generation control program.

Figure 2:
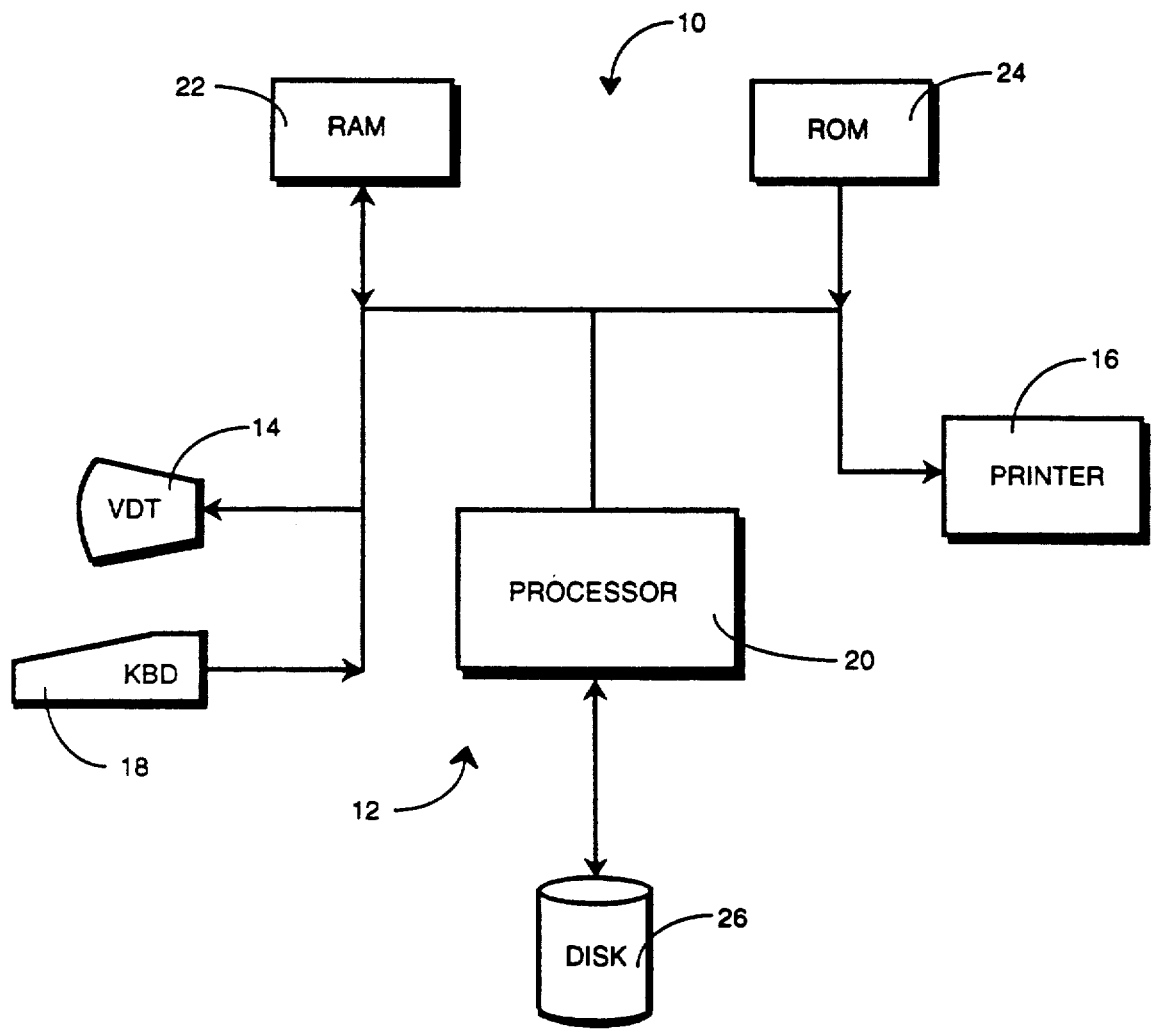
FIG. 2 is a block diagram schematic of the computer system of FIG. 1.

With respect to FIGS. 1 and 2, a computer system 10 includes a computer 12, a video display 14, a printer 16 and a keyboard 18. The computer 12 can be a microcomputer of the IBM PC, PC-XT or PC-AT class or equivalent. It will be understood that the detailed structure of the computer system 10 is not a limitation of the present invention.

The computer 12 includes a processor 20 coupled to random access memory 22 and a read only memory 24. A disk drive or drives 26 provide additional storage for the system 10.

The system 10 operates in conjunction with one or more control programs for the purpose of carrying out its desired function or functions. As is well known, the system 10 is conventionally used with an operating system which is commercially available from International Business Machines Corporation, known as PC DOS and from Microsoft Corporation known as MS DOS.

A variety of programming languages are available which can be used to create application packages. A broad class of such languages, generally referred to as fourth generation languages has been developed to make the creation of application packages somewhat easier. Such languages are described in a three volume set entitled *Fourth-Generation Languages* by James Martin, published by Prentice Hall. Volume I of this set carries a copyright date of 1985. Volumes II and III of this set carry copyright dates of 1986.

One such language is a table driven language marketed under the trademark APPLAUD by International Consulting Enterprises, Ltd. Attached hereto as Exhibit A is a copy of the Reference Manual for that language. Exhibit B attached hereto identifies, for convenient reference, the different types of tables that can be defined using the APPLAUD language.

The computer system 10 in combination with a manual generating program can be utilized to automatically create user documentation including user guides or manuals for application programs created using the APPLAUD language or other high level languages. While the present description is with respect to application packages created using the APPLAUD language, it will be understood that the present invention can be used with application packages generated using other high level languages.

A given application package, for example a Payroll System, will be composed of programs and related applications such as time keeping, or check generation. Both the overall application package and the individual applications need user documentation.

Figure 3:
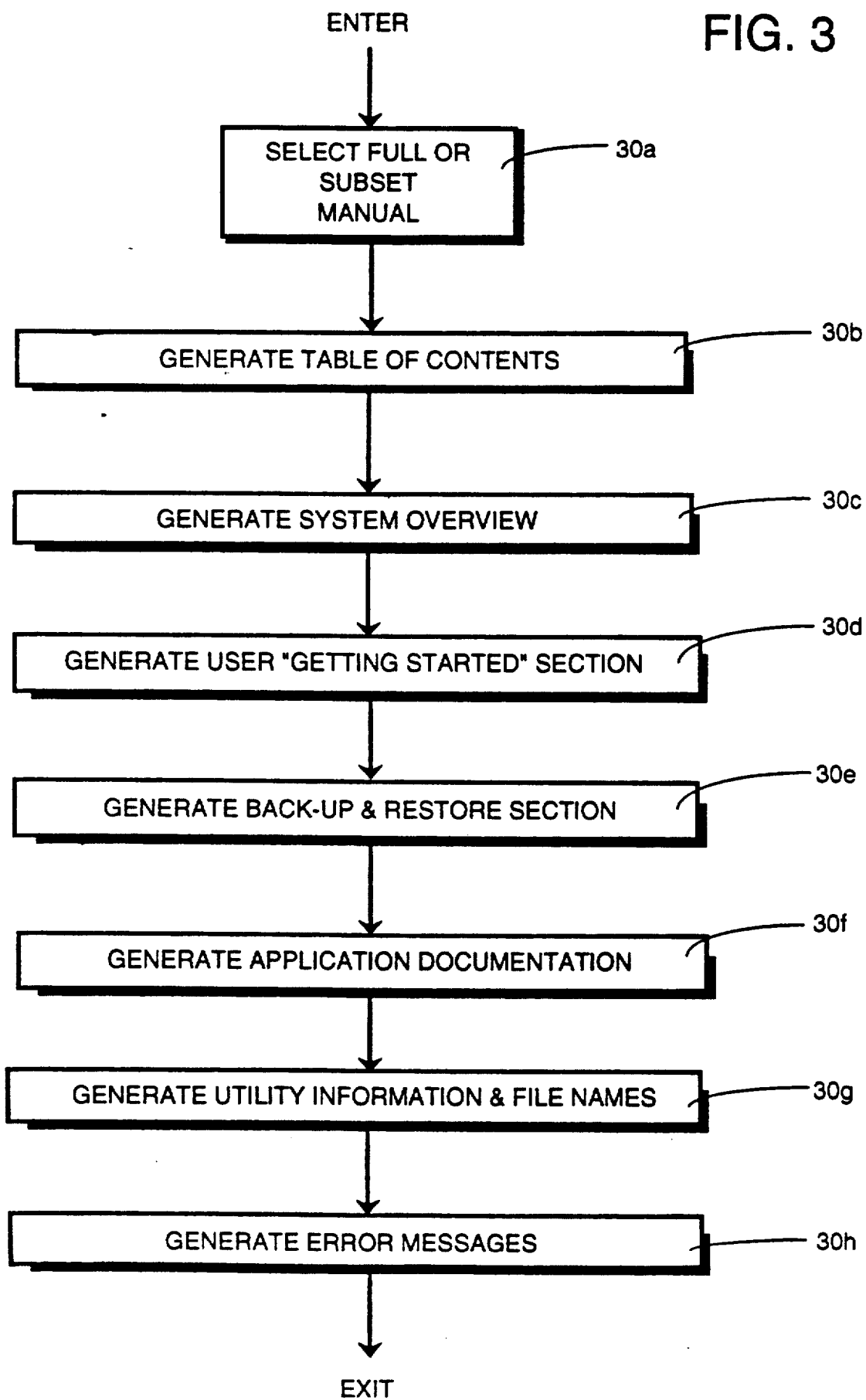
FIG. 3 is an overview flow chart of a method of automatically producing user documentation in accordance with the present invention.

FIG. 3 is an overall flow diagram of the present method of utilizing the computer system 10 in combination with a stored documentation generating control program. As illustrated in FIG. 3, the control program is entered and in an initial step 30a a decision is made whether or not a complete copy of the manual is to be generated, providing documentation for all aspects of the application package or for only a subset of the application package, that a specific user might access. In a subsequent step 30b, the table of contents of the manual is automatically generated. An application overview is then provided which in summary form identifies available functions or capabilities and data bases in a step 30c.

In a subsequent step 30d, a "Getting Started" section is provided which describes the steps a user has to go through to minimally make use of the application package. This includes logging on and off, screen contents, keyboard operation, menu functions and basic operational procedures. In a subsequent step 30e, the backup and restore procedures are described.

The functions and capabilities of each application of the application package are then documented in a step 30f. In the next step 30g, available utility features are documented along with file names. Finally, in a step 30h, system error messages and an explanation of each are provided in the manual.

Utilizing the method of FIG. 3, results in an automatically generated user guide or manual describing the functions and capabilities of the subject application package. Since the application package can be created in a variety of different languages, it will be understood that the detailed structure of any particular selected language is not a limitation of the present invention.

Figure 4:
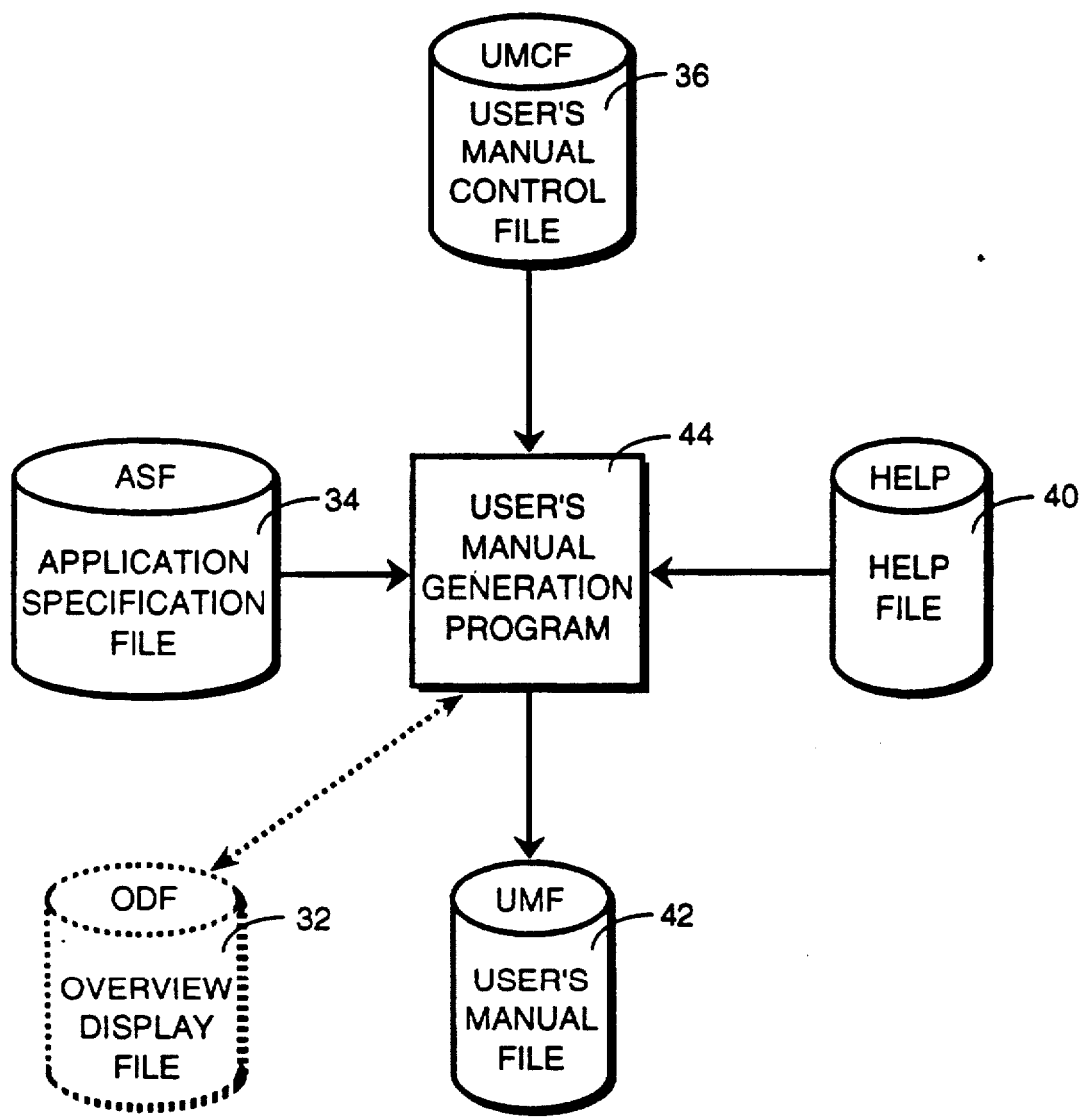
FIG. 4 is a block diagram representation of files utilized by the method and apparatus of the present invention.

FIG. 4 illustrates the overall structure of a set of files utilized in the present guide or manual generating process. An application specification file 34 contains the specification for the application package. This includes data dictionary tables, data base tables, application tables and necessary function tables.

A user's guide or manual control file 36 contains both text and commands. The commands control the creation of the user's manual. The text is inserted in appropriate places in the manual as it is being generated.

A help file 40 contains pre-defined text that can be displayed on the display terminal 14 in response to a user pressing a "help" key on the keyboard 18. The same text is inserted into the user's manual when documenting run-time operation of certain features. The help file 40 while useful is not essential to practicing the present invention.

A user's manual output file 42 contains the resulting user's manual. Text stored in the file 42 can either be printed using the printer 16 or displayed using the terminal 14. The user's manual generation process utilizes the contents of the files 34–42, as discussed and described subsequently, in combination with a user's manual generation program 44 to create the final product user's guide or manual.

Table 1 lists and explains the function of each of the available commands which can be used to define the resultant manual. Table 2 identifies and explains a plurality of conditional exclusionary commnfands usable to expand upon the capability of the commands of Table 1. The use of commands and exclusions from Tables 1 and 2 is discussed further subsequently.

FIGS. 5 through 22, taken together, are a set of flow charts which define the user's manual generation program 44 and a method in accordance with the present invention for automatically generating the contents of the user's manual output file 42. The programs of FIGS. 5-22 can be implemented in a variety of computer languages for execution on the computer system 10. The computer language in which the programs of FIGS. 5-22 are implemented is not a limitation of the present invention.

Table 3 defines the meaning of various text element variables from Table 4. Table 4 defines the meaning of various text elements found on the flow charts of FIGS. 5-22. Tables 3 and 4 are to be read in conjunction with the disclosure of FIGS. 5-22 in describing the operation of the control program 44 and the method of the present invention.

FIGS. 5A-5D, taken together, are a set of flowcharts which describe the main line logic of the program 44. Various routines are called by the mainline program of FIGS. 5A-5D. The routines are described on subsequent Figures which are referenced on FIGS. 5A-5D.

Figure 5A:
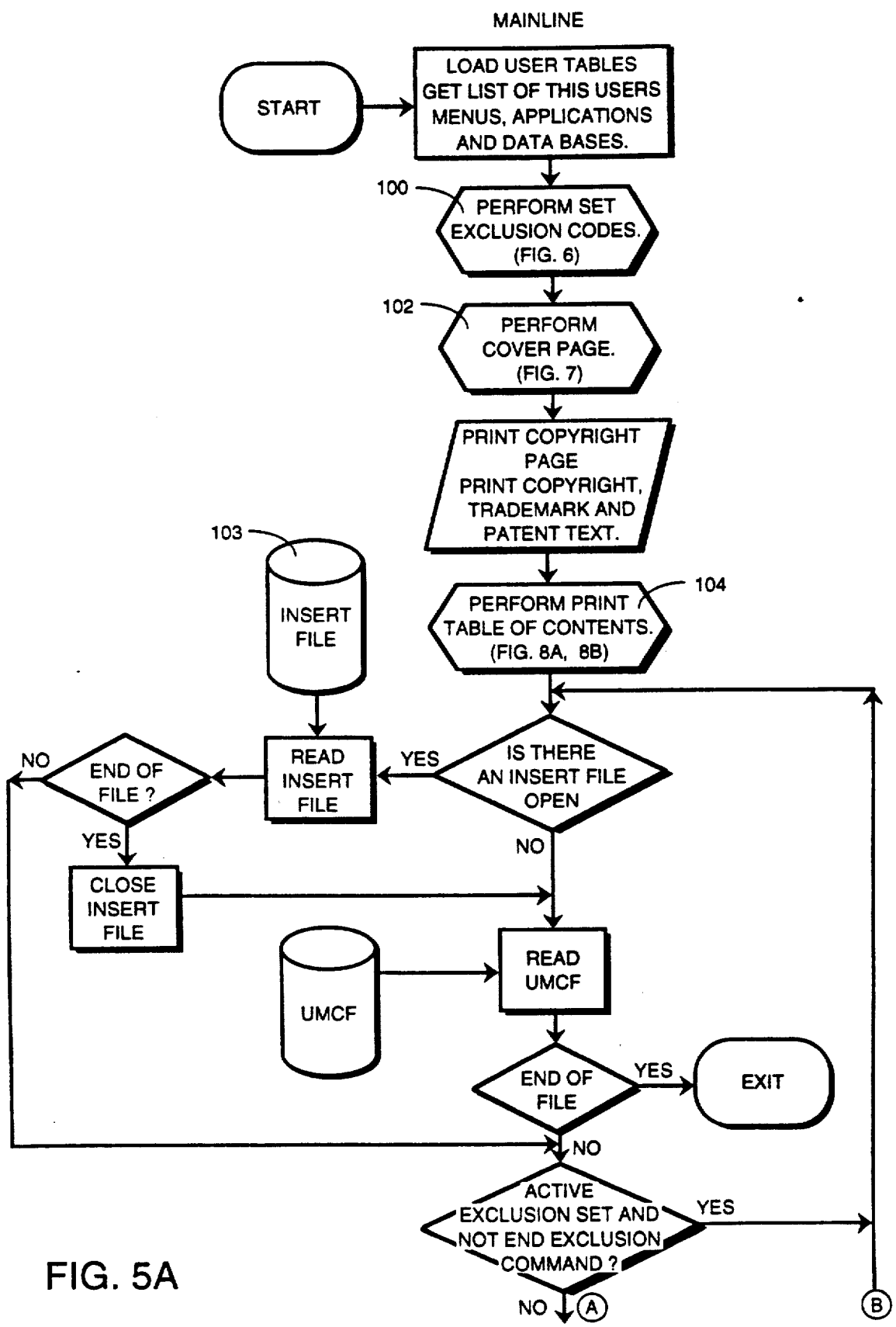
FIGS. 5A-5D, taken together, are a flow chart of a program in accordance with the present invention for generation of the user's manual output file.
Figure 6:
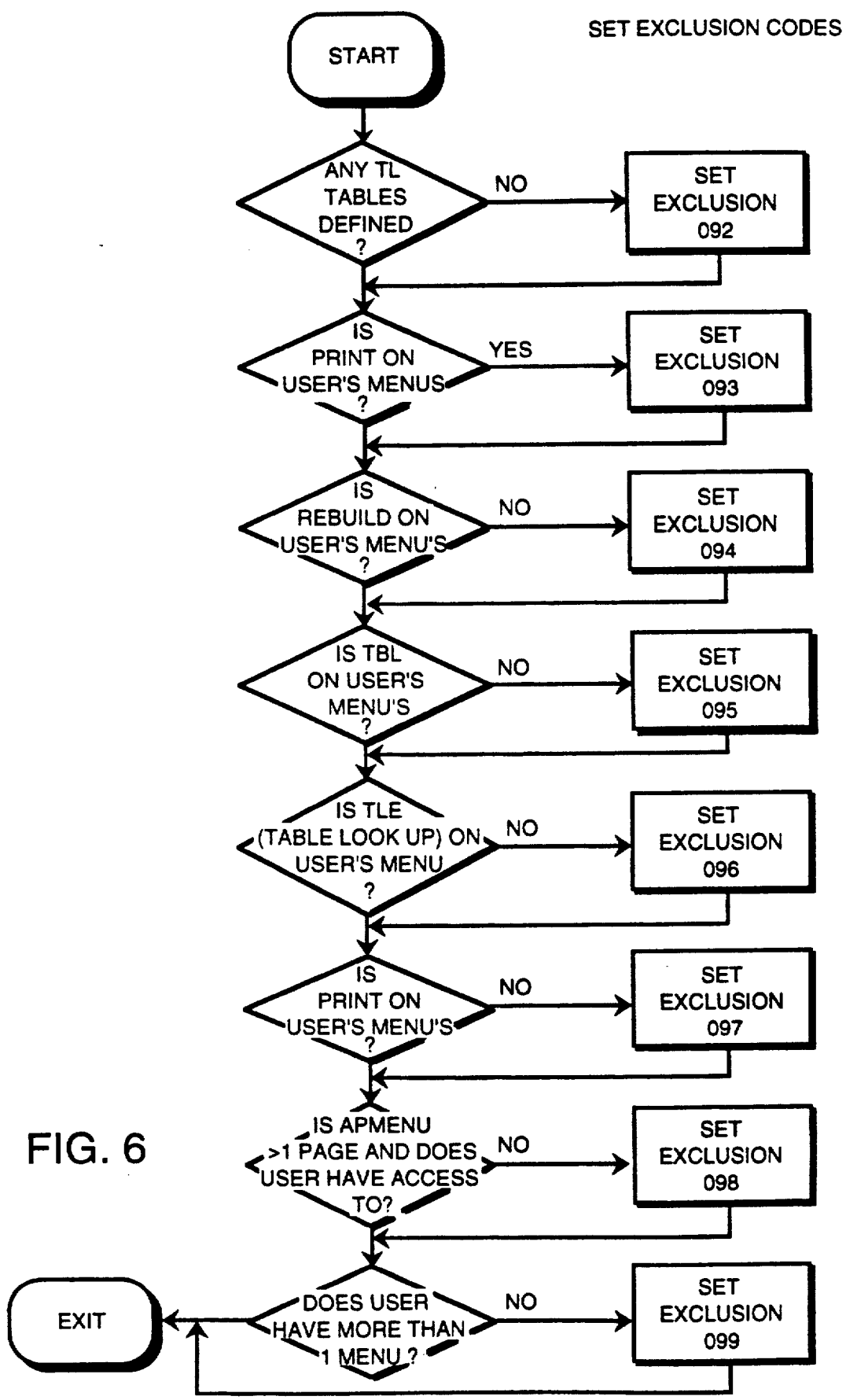
FIG. 6 is a flow chart of a routine which defines the process of initializing the exclusion codes associated with the user's manual.

With respect to FIG. 5A, in a step 100, the exclusionary codes are set in accordance with the routine of FIG. 6. In a step 102, a character stream for the cover sheet for the user's manual is generated and loaded into the user's manual file 42 utilizing the routine of FIG. 7. An insert file 103 provides a storage file and a vehicle whereby an application developer can include customized text to be added to the overview portion of each section of the manual. It is used in conjunction with the $$FIL command described in Table 1. In a step 104, a character stream for the table of contents of the user's manual is generated and loaded into the user's manual file 42 in accordance with the routine of FIGS. 8A and 8B.

Figure 5B:
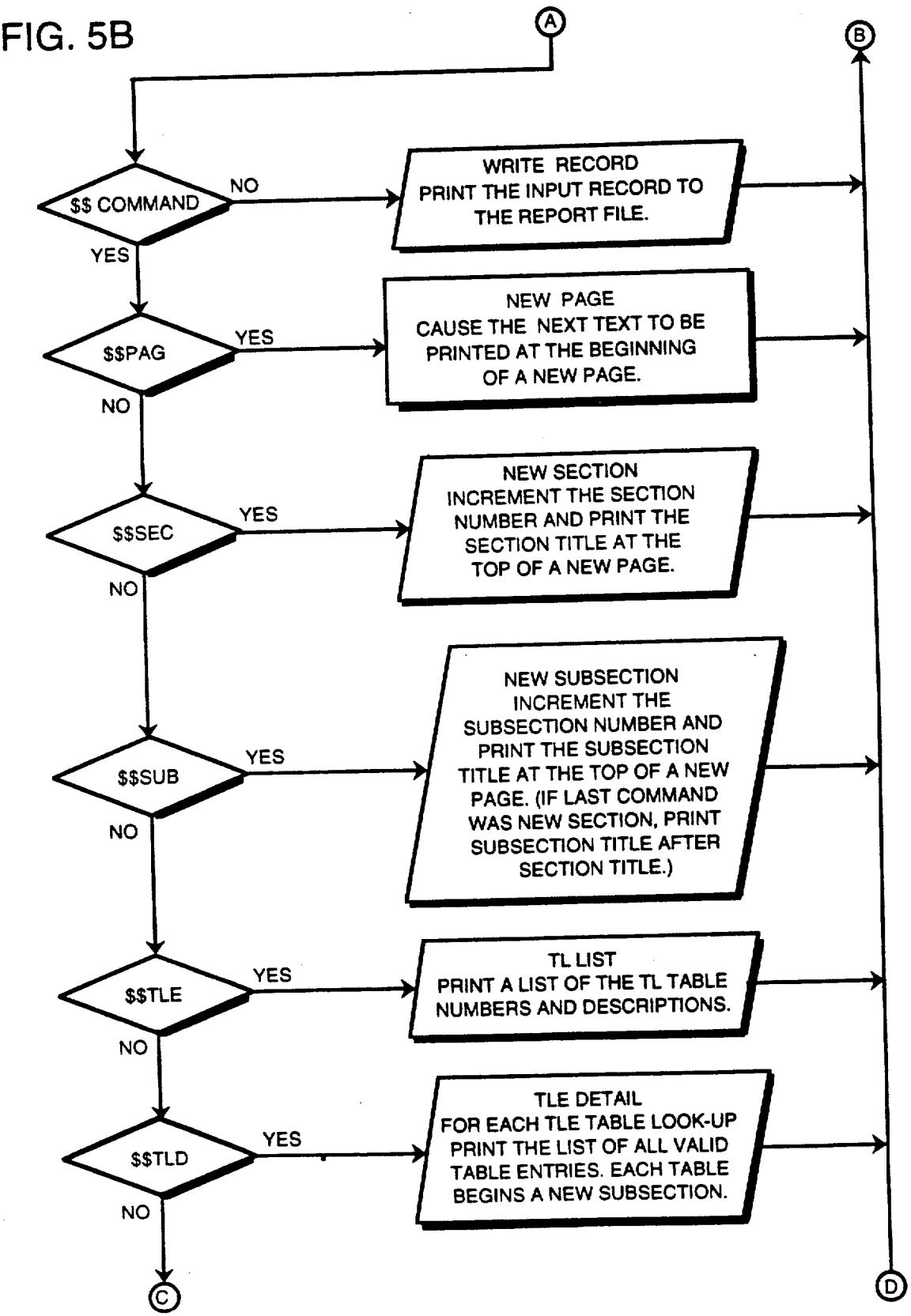
Figure 5C:
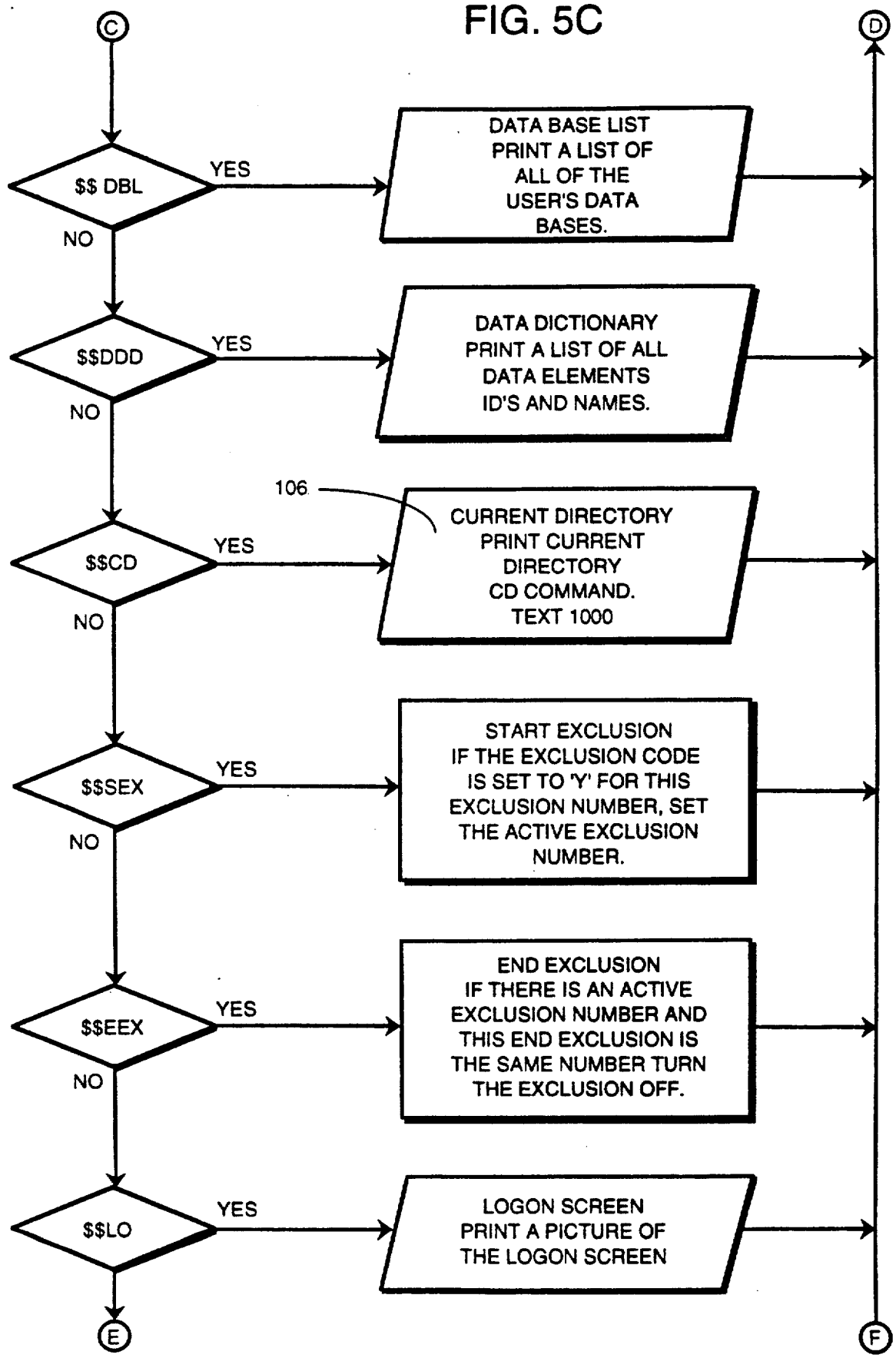
Figure 5D:
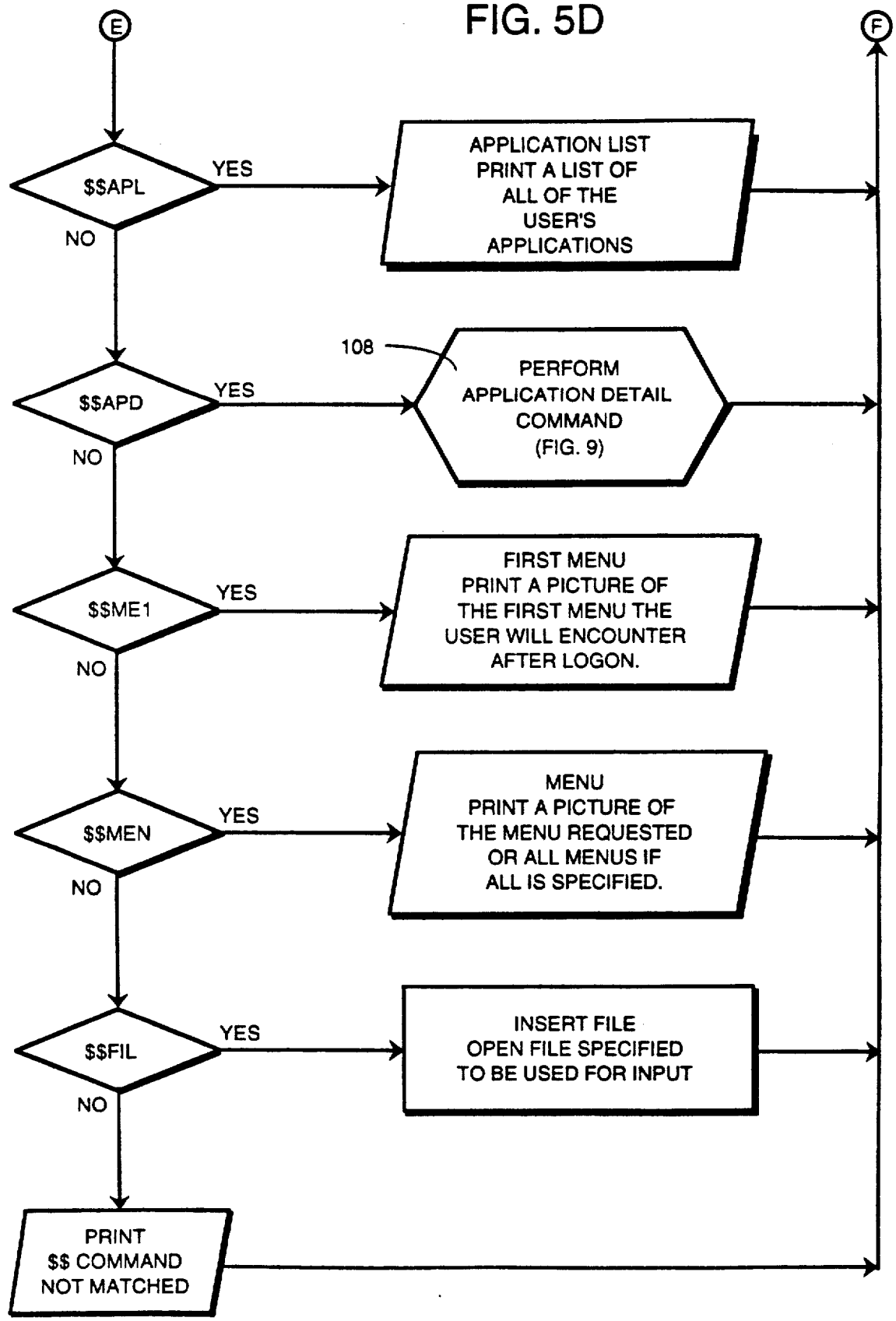

FIGS. 5B, 5C and 5D detail the analysis of various available commands in the user's manual control file 36 and identify actions which are taken in response thereto. In a step 106, for example, FIG. 5C, text element "1000" identified in Table 4, is loaded into the user's manual file 42 for subsequent display or printing.

Figure 9:
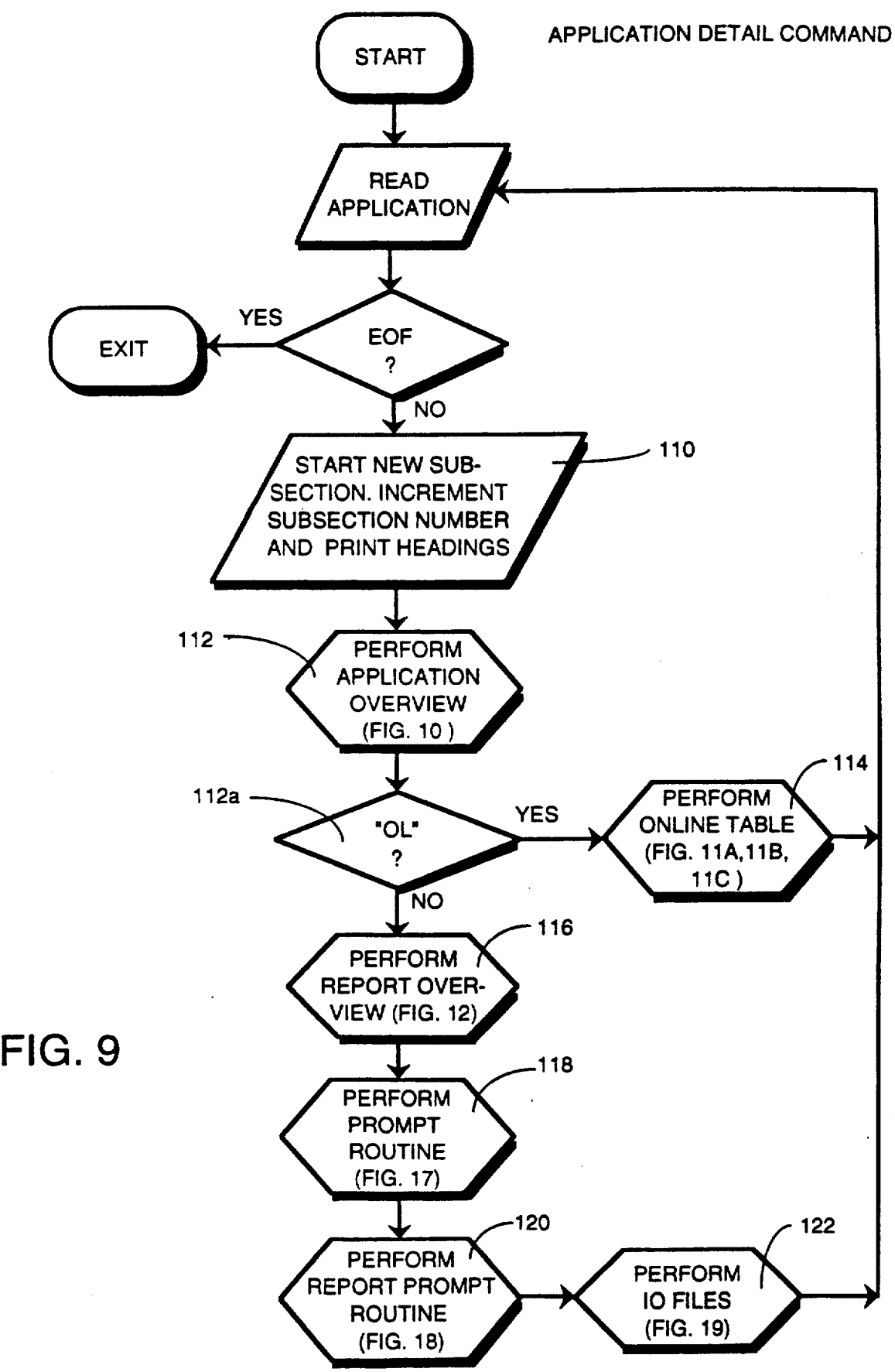
FIG. 9 is a flow chart of a routine which defines the overall process of generation of the application documentation.

With respect to FIG. 5D, in a step 108, in response to detecting the application detail command, the application detail routine defined in FIG. 9 is executed for purpose of generating the text and related documentation for each application in the application package.

It will be understood that the program of FIGS. 5-22 can be used to generate user's manuals for a wide variety of application packages. The specific application package for which a manual is to be generated is not a limitation of the present invention.

FIG. 6 defines the Set Exclusion Code routine, callable from the main line program, step 100, for setting various exclusion codes. The exclusion codes have been previously defined in Table 2.

Figure 7:
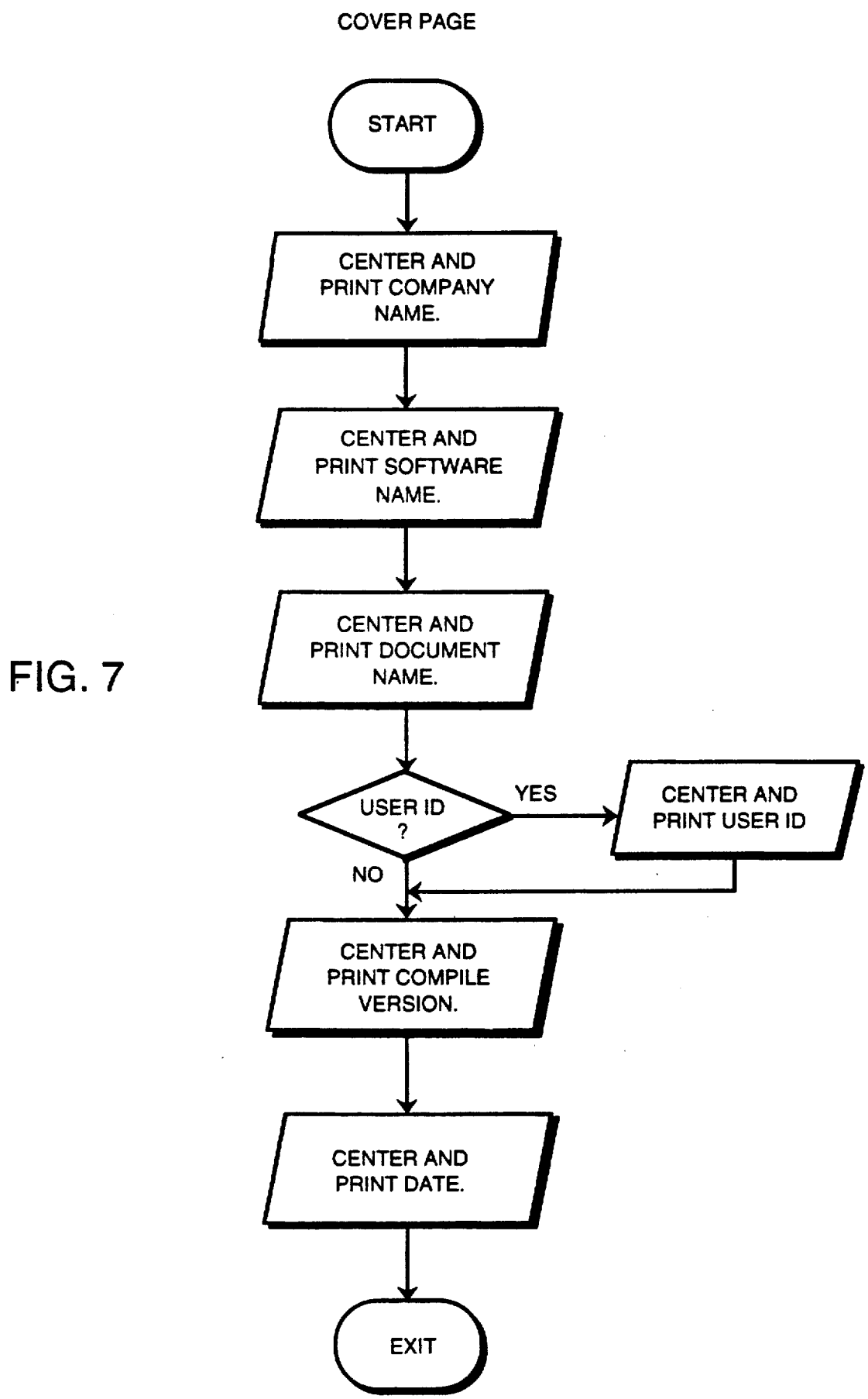
FIG. 7 is a flow chart of a routine which defines the process of creating the cover page for the user's manual.

FIG. 7 defines the Cover Page generation routine, called in the step 102, for generating the text for a cover page for the user's manual. The cover page is personalized for the application package as well as the user for whom the manual is being generated.

Figure 8A:
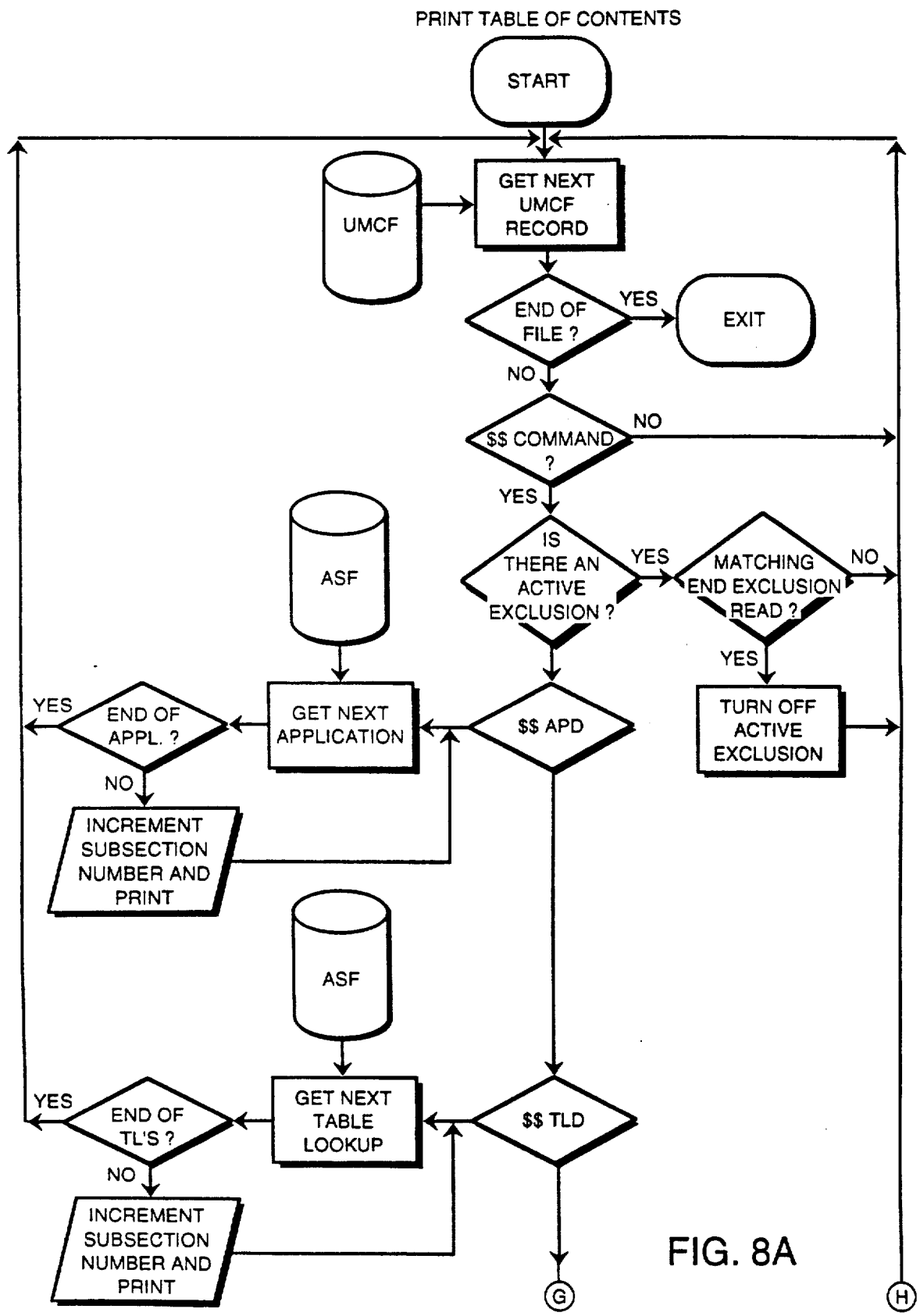
FIGS. 8A and 8B, taken together, are a flow-chart of a routine which defines the process of producing the table of contents for the user's manual.
Figure 8B:
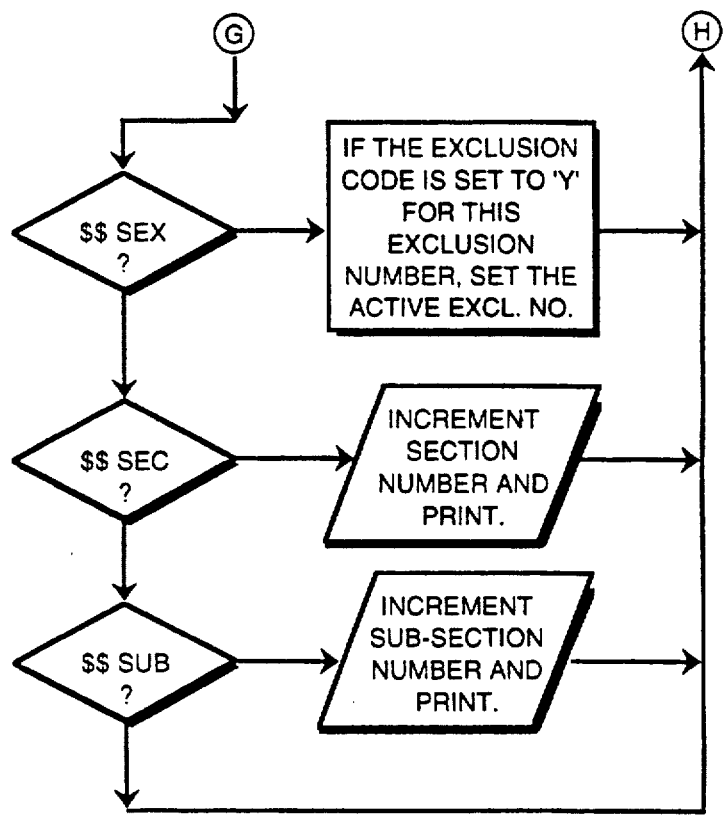

FIGS. 8A and 8B, taken together, define the Print Table of Contents routine, called from the main line program of FIG. 5A in the step 104 for generating and loading the table of contents into the user's manual file 42. The table of contents is produced by reading through the entire user's manual control file 36 from beginning to end, prior to producing the character strings of text for the file 42.

The routine of FIGS. 8A and 8B examines the contents of the control file 36 to determine all elements of the user's manual which will cause a new section or sub-section to be generated. Information concerning these sections and sub-sections is accumulated and used to generate the table of contents for the user's manual file as the routine is executed.

FIG. 9 is an Application Detail generation routine defining the generation of the documentation for each of the applications within the application package. With respect to FIG. 5D, in the step 108, the routine of FIG. 9 is called. The routine of FIG. 9, when executed, reads information from the application specification table file 34 and then subsequently, in a step 110, begins a new sub-section of the user's manual for each new application in the application package.

Figure 10:
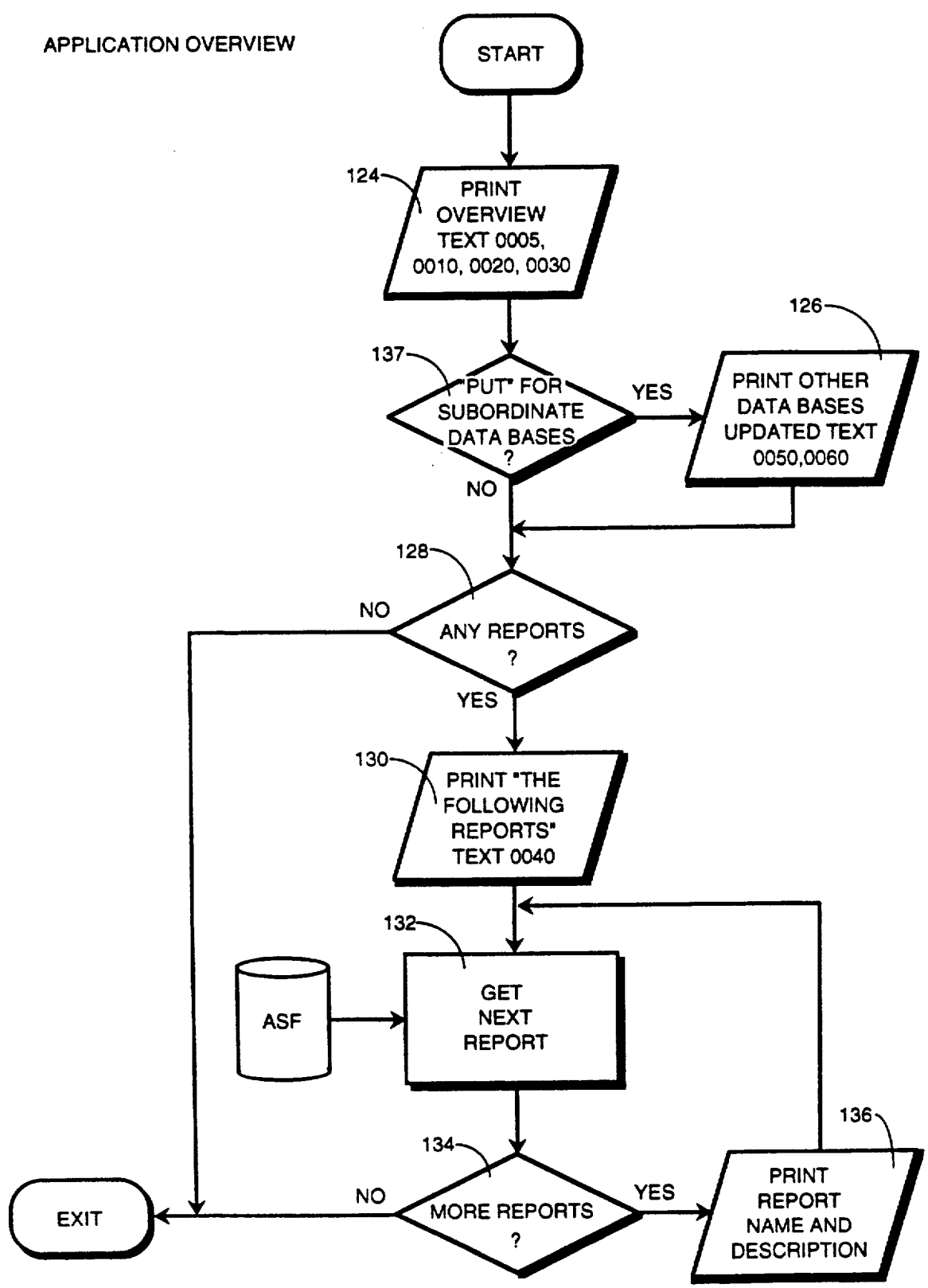
FIG. 10 is a flow chart of a routine which defines the process of generating the application overview section of the manual.
Figure 11A:
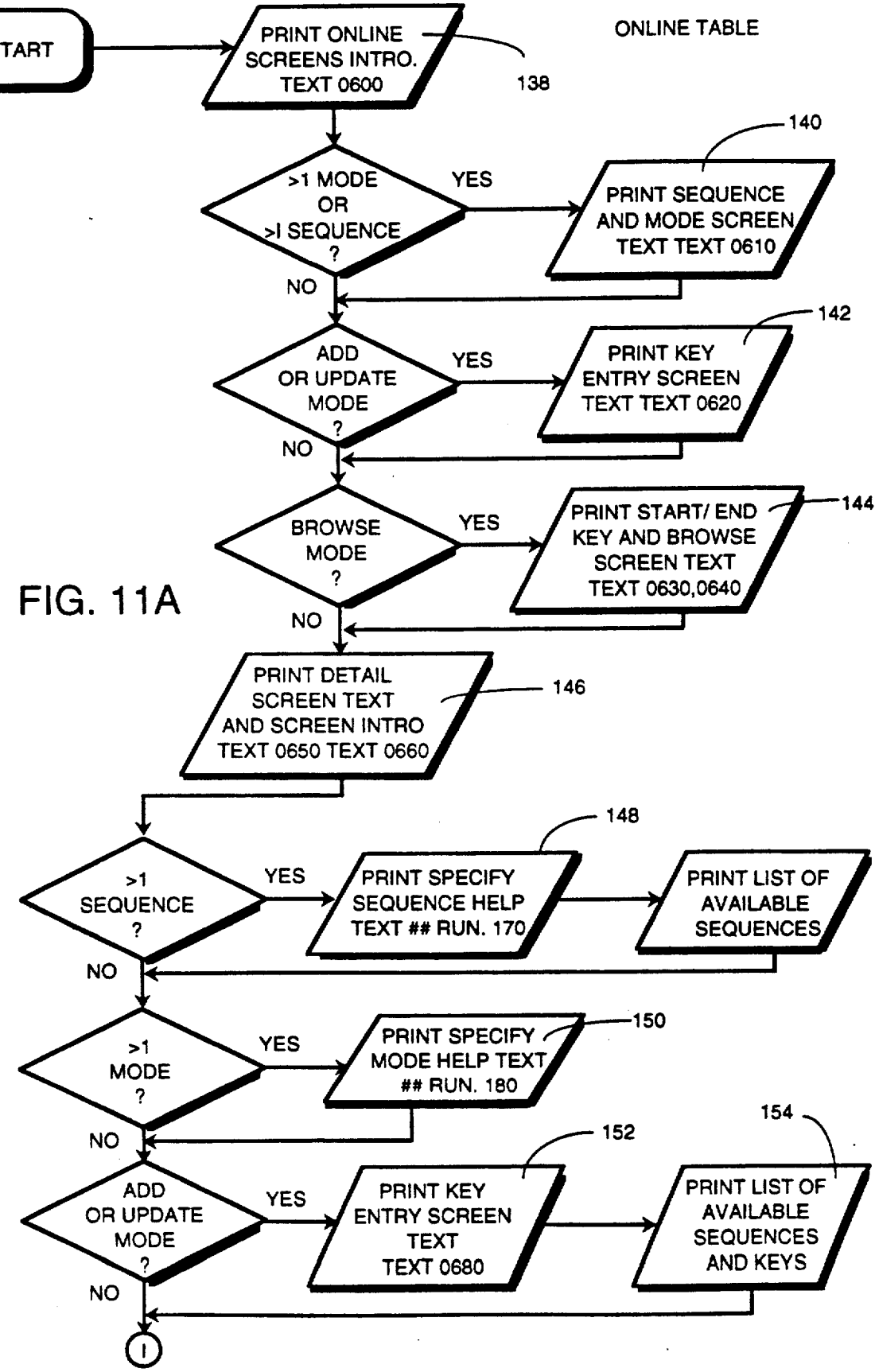
FIGS. 11A, 11B, and 11C, taken together, are a flow chart of a routine which defines the generation of user's manual text for on-line applications.
Figure 11B:
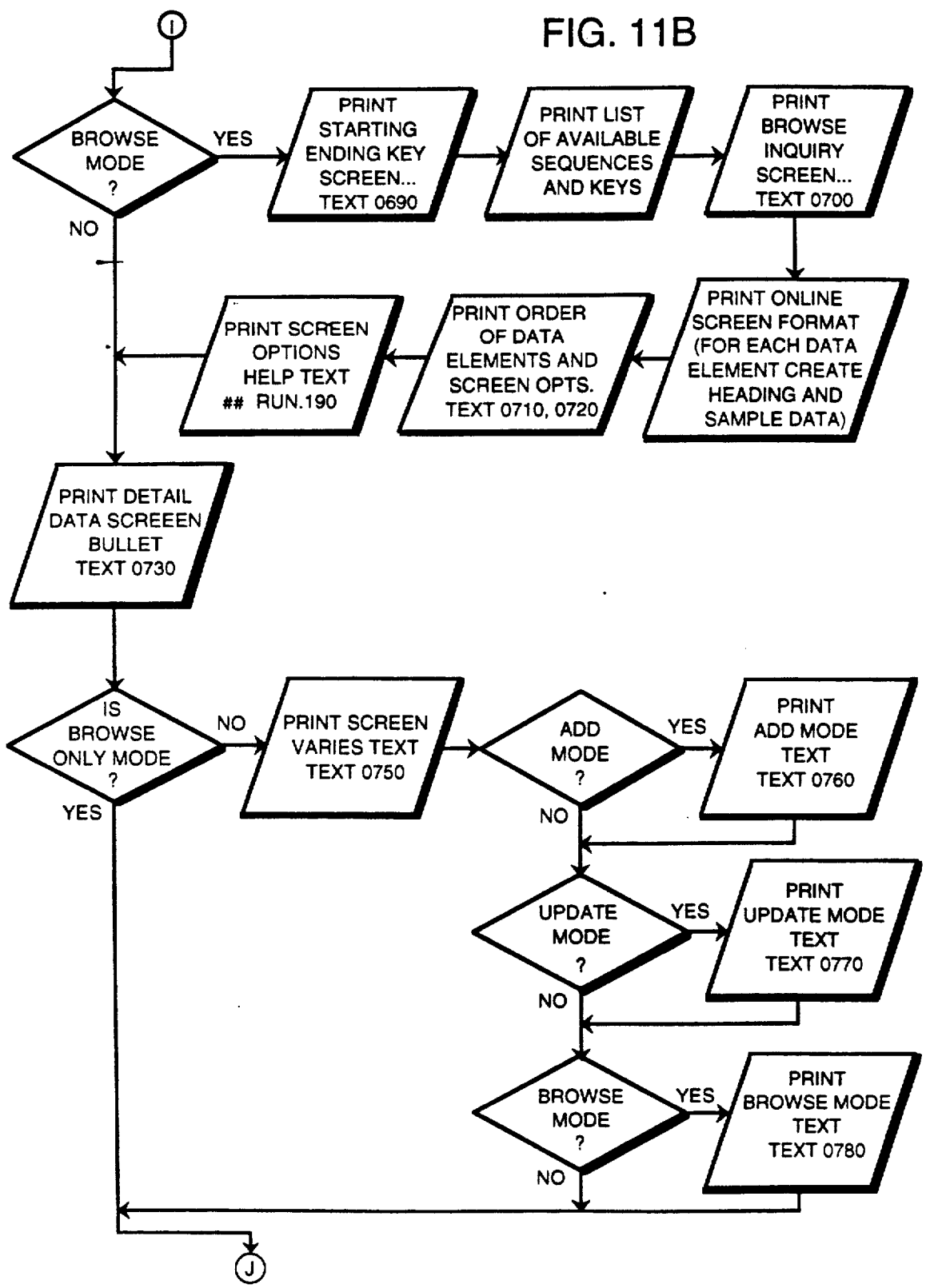
Figure 11C:
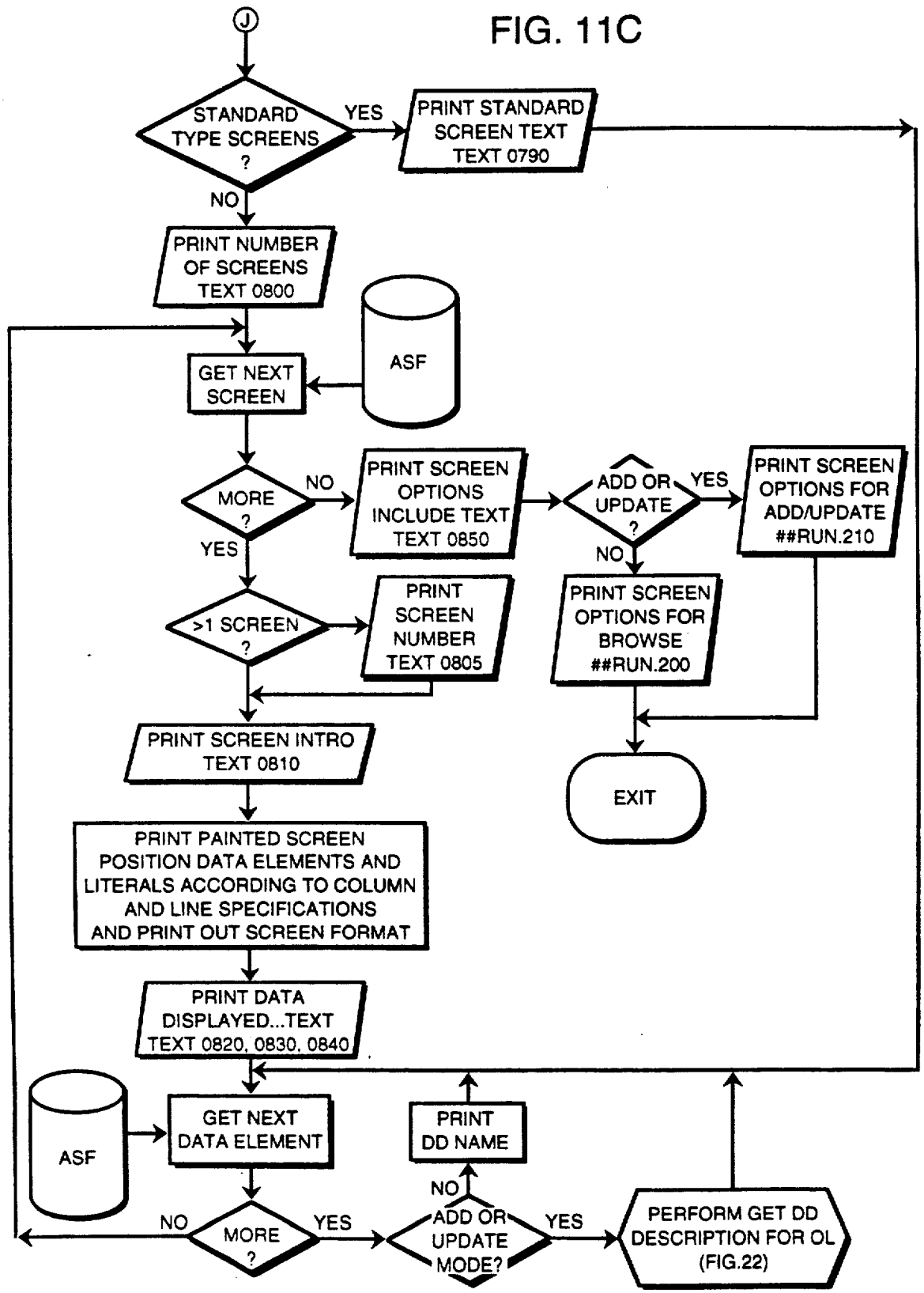

In a step 112 the application overview routine of FIG. 10 is then executed. In the event that the present application is an on-line application, detected in a decision block 112a, the on-line table generation routine of FIGS. 11A-11C is executed in a step 114.

Figure 12:
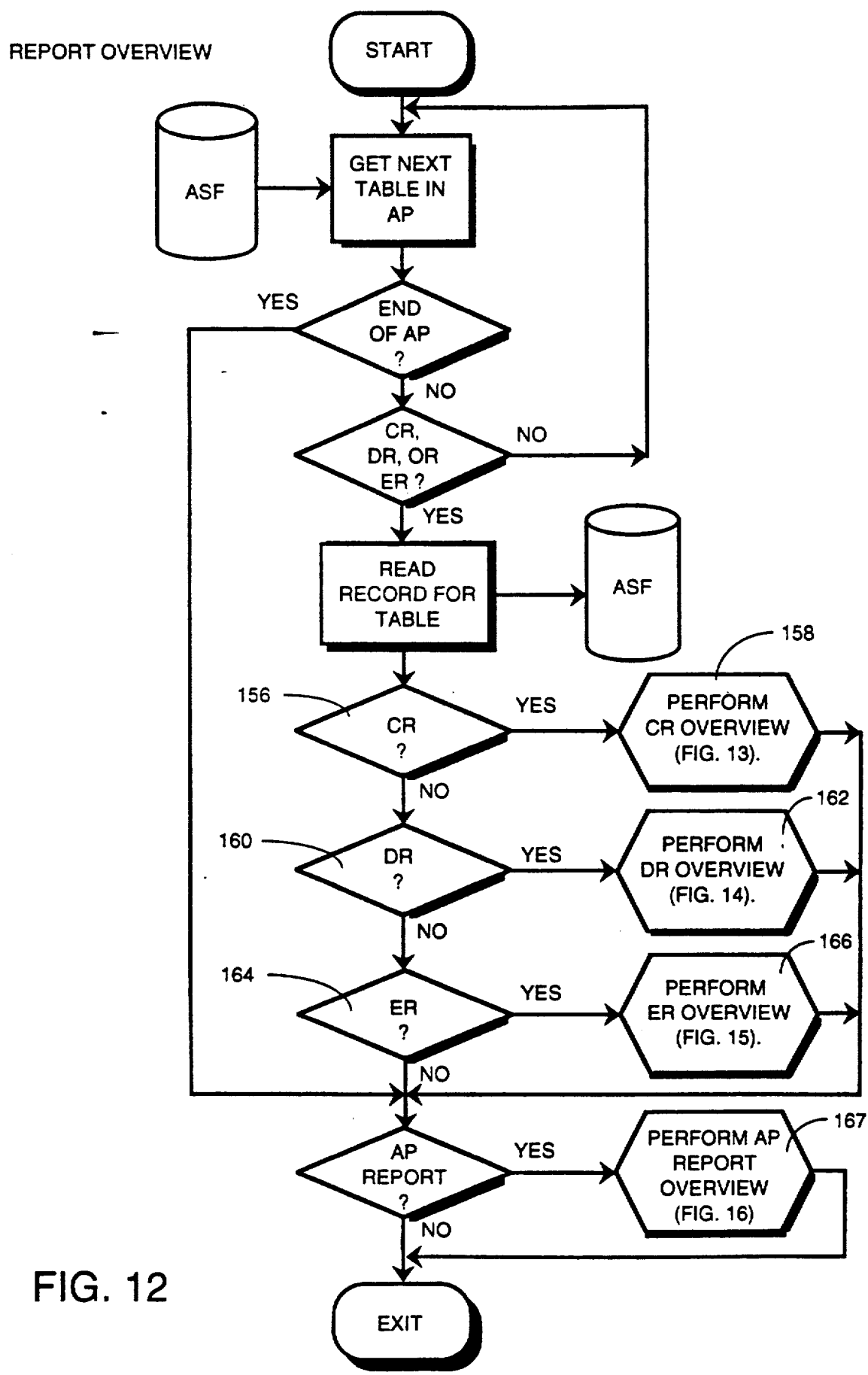
FIG. 12 is a flow chart of a routine which defines the overall process of documenting application dependent reports.
Figure 18A:
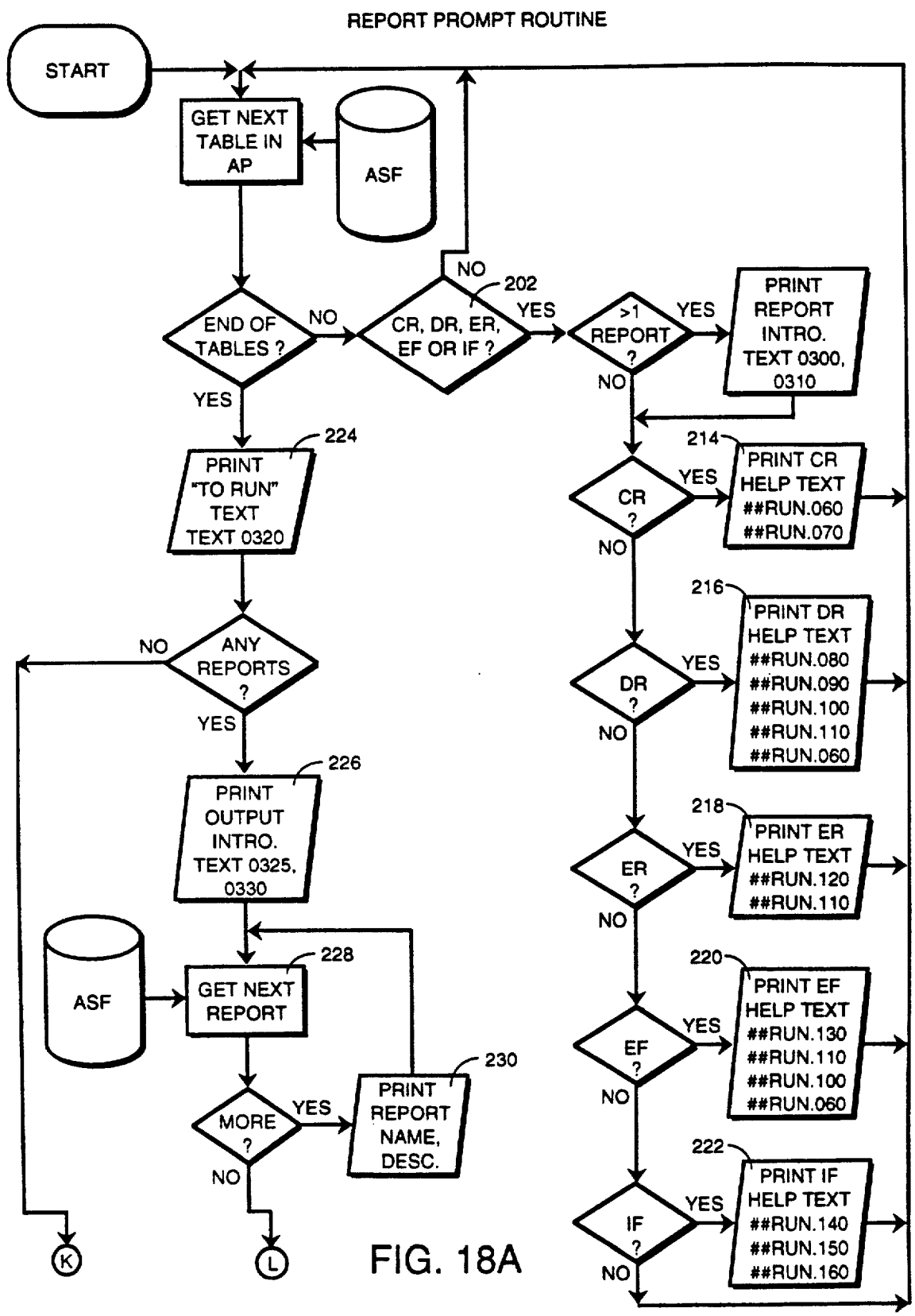
FIGS. 18A and 18B is a flow chart of a routine which defines the process of generating portions of the run-time prompt section of the user manual.
Figure 18B:
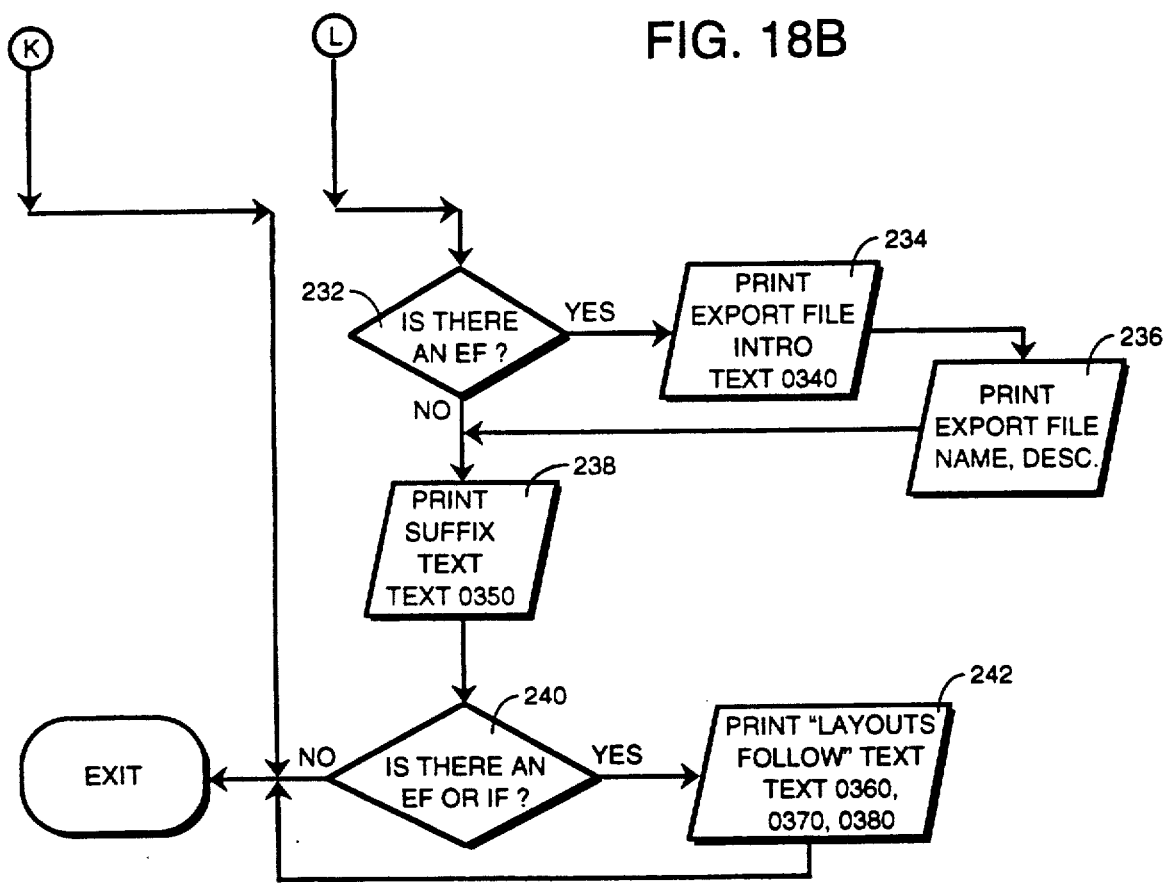
Figure 19:
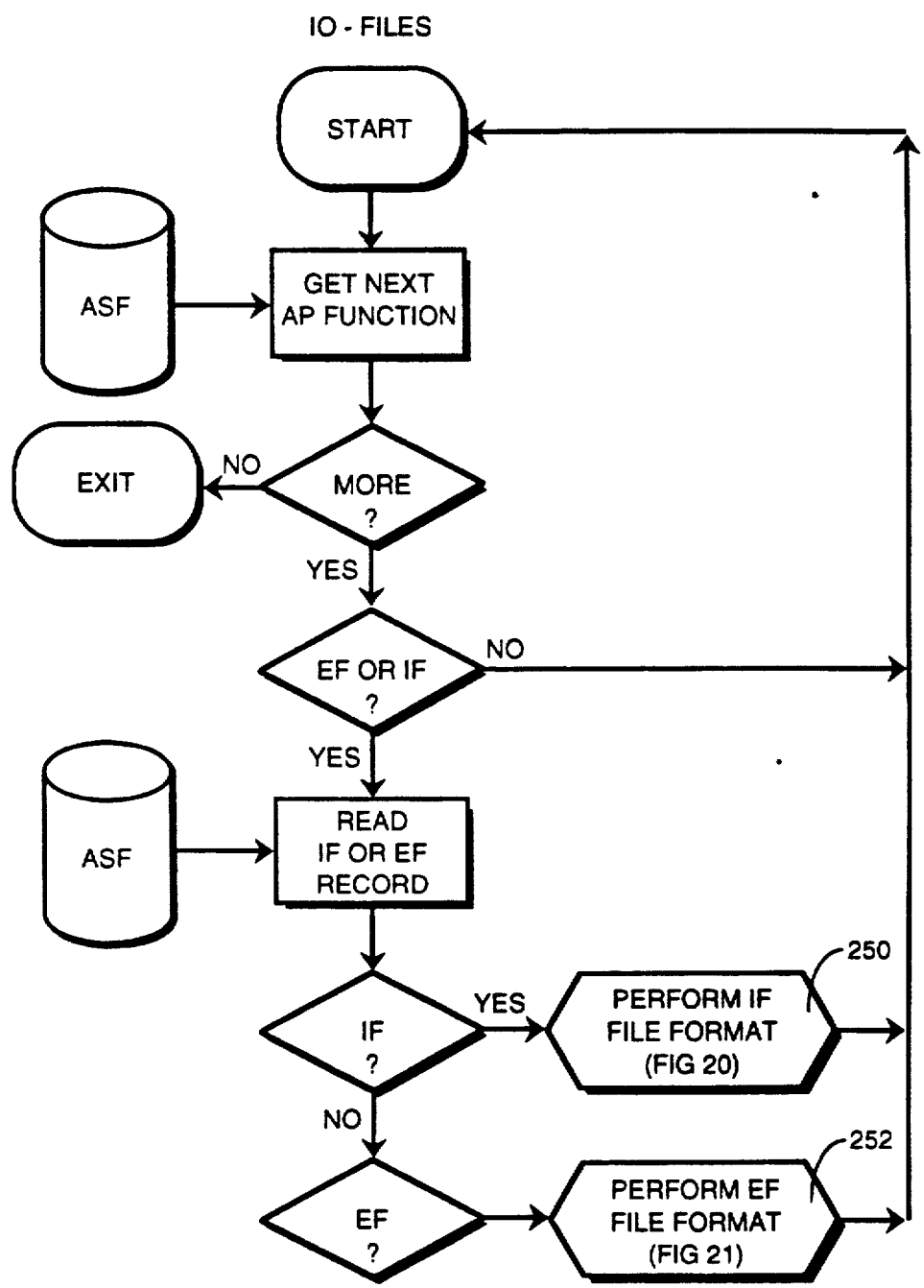
FIG. 19 is a flow chart of a routine which defines the process of locating and formatting import file and export file tables.

Further, in a step 116, the report overview routine of FIG. 12 is executed. Subsequently, in steps 118 and 120, the prompt routine of FIG. 17 and the report prompts routine of FIG. 18 are executed for the purpose of generating listings of all run-time prompts. Finally, in a step 122, the IO file routine of FIG. 19 is executed for the purpose of identifying all import file (IF) and export file (EF) tables.

FIG. 10 is a flow chart defining the Application Overview routine which is called in the step 112 of FIG. 9. Text and characters are generated which will ultimately be printed to form the application overview for the user's manual.

The application overview describes the basic features and functions of a given application. In this regard, in a step 124, introductory overview text elements such as, text elements 0005, 0010, 0020, and 0030 are loaded into the user's command file 42. Subsequently, in a step 126, subordinate data bases that can be updated through "put" commands are listed. Finally, in a series of steps 128-136, all reports produced by the application are listed and described.

The "PUT" COMMAND noted in a step 137 is an APPLAUD language command to update secondary or subordinate data bases. It will be understood that different languages might have a similar command even if it has a different name. It will be understood that the names a given language uses for its commands are not a limitation of the present invention.

FIGS. 11A, 11B and 11C, taken together, are a flow chart of the process for generating documentation text for on-line applications. In an initial step 138, a character stream for on-line screens introductory text, element number 0600 is generated and stored in the output file 42.

Subsequently, in a group of steps 140-146, the list of available on-line screens is generated including predefined text strings and stored in the output file 42. In a later sequence of steps 148-154 explanatory information is generated for insertion into the user's manual file 42 for sequence, mode specification and key entry screens. FIGS. 11B and 11C disclose additional steps associated with the generation of text for on-line applications.

FIG. 12 is a flow chart of the Report Overview routine. This routine defines the process of documenting reports for each application. The routine of FIG. 12 in a step 156 determines if a columnar report is to be generated. If so, it calls the Columnar Report Overview routine, FIG. 13, in a step 158.

Figure 14:
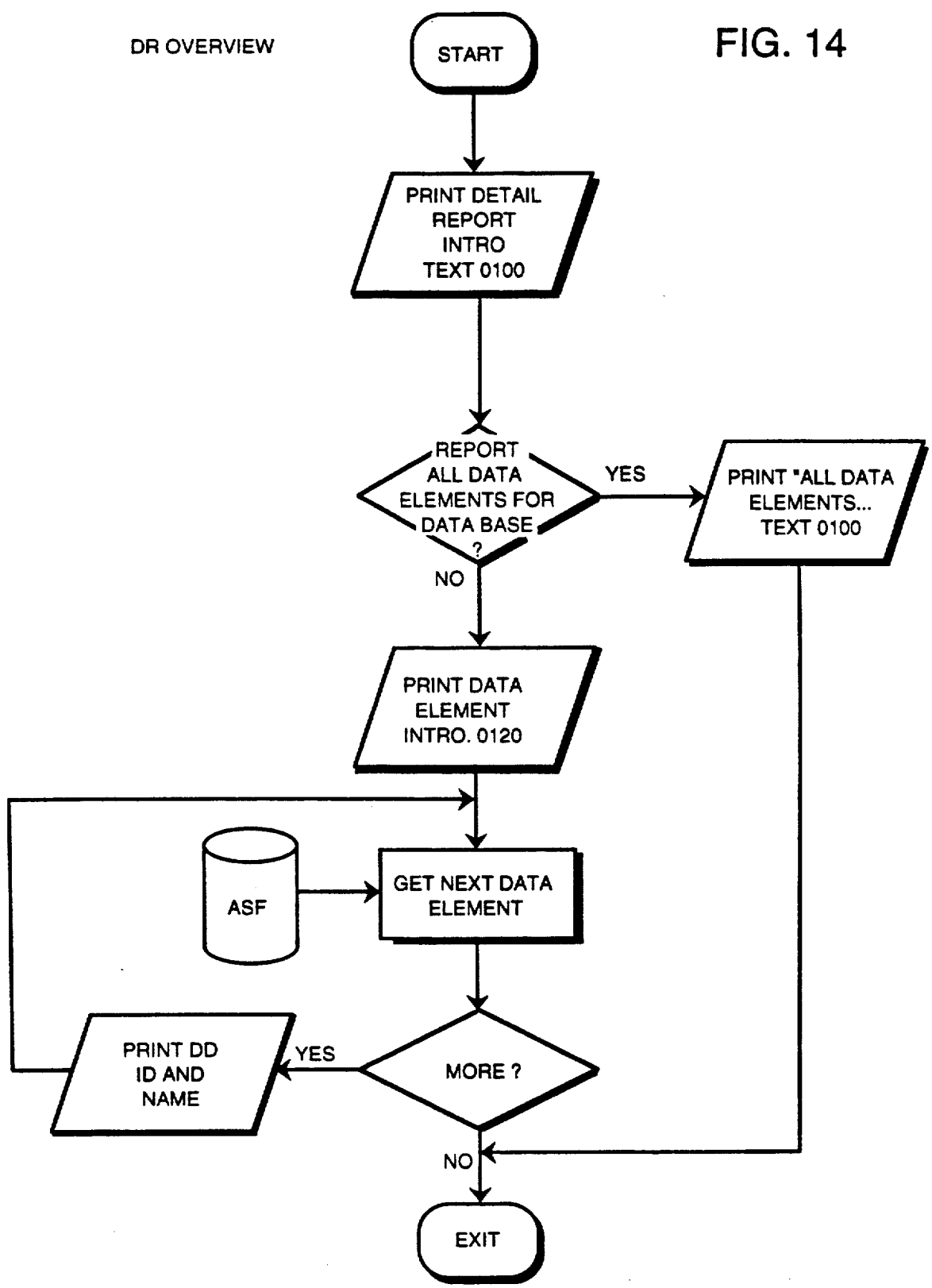
FIG. 14 is a flow chart of a routine which defines the process of documenting detail reports.
Figure 15:
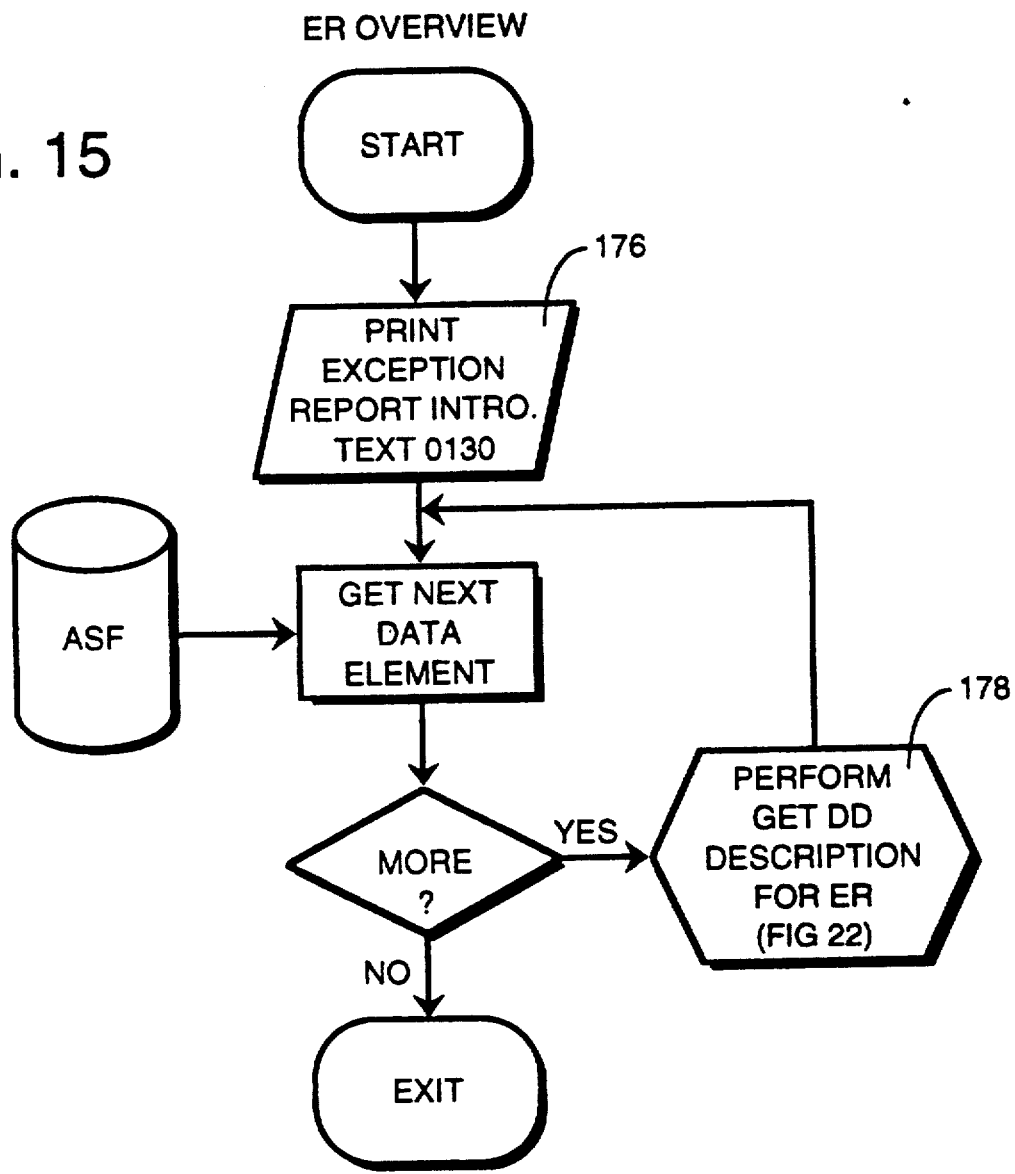
FIG. 15 is a flow chart of a routine which defines the process of documenting exception reports for the application.

Similarly, the Report Overview routine tests to determine whether or not one or more detail reports are to be generated in a step 160. If so, the Detail Report Overview routine, FIG. 14, is called in a step 162. The Report Overview routine of FIG. 12 also checks to determine whether or not any exception reports are to be generated in a step 164. If so, the Exception Report Overview routine, FIG. 15, is called in a step 166. If multiple reports are produced from a given application the Report Overview routine in FIG. 12 will document each report.

Figure 13:
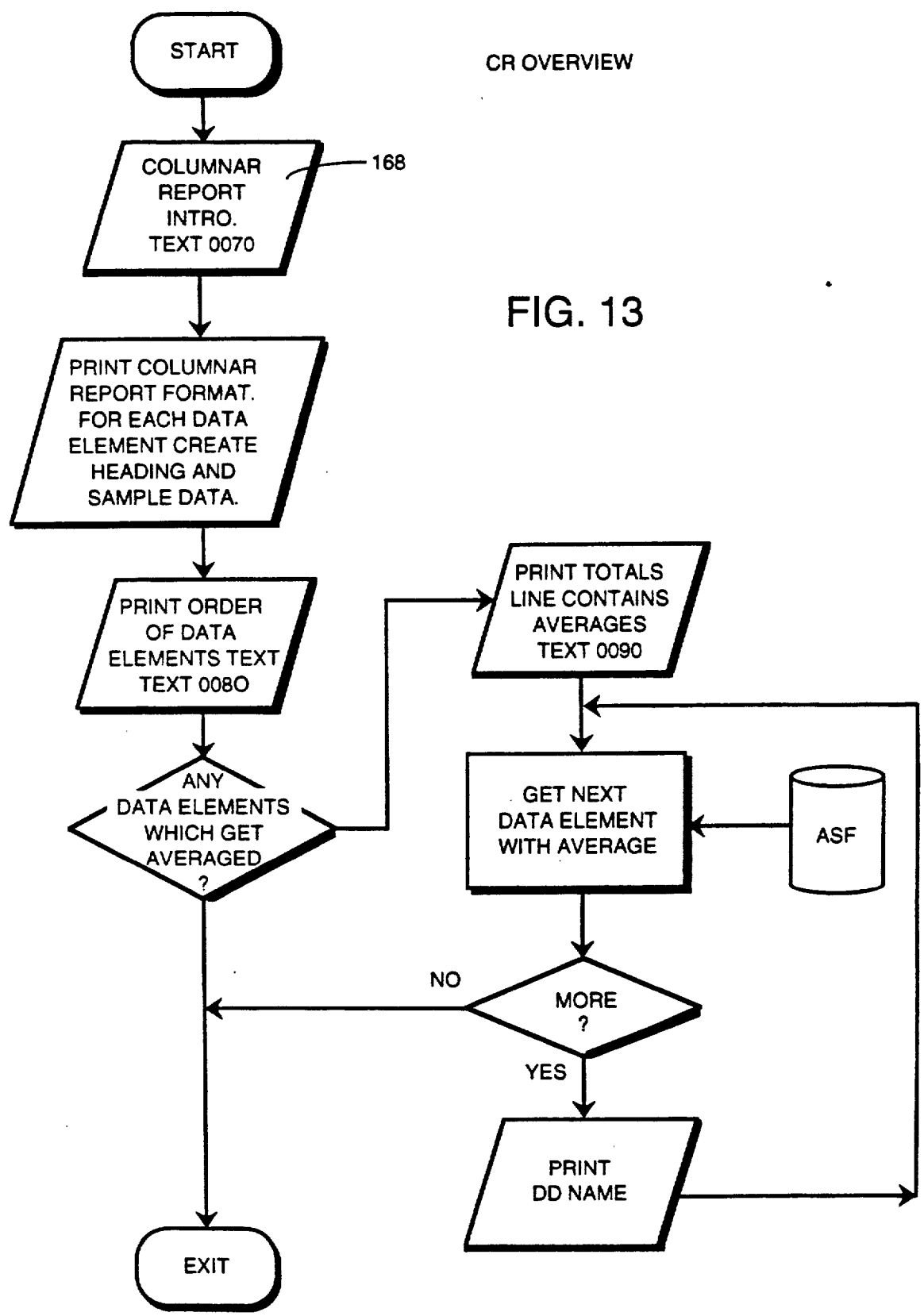
FIG. 13 is a flow chart of a routine which defines the process of documenting columnar reports.

FIG. 13 is a flow chart for the Columnar Report overview routine. This routine documents each of the produced columnar reports. In a step 168, an introduction to the columnar report is generated and transferred to the user's manual file 42. Subsequently, further documentation for each of the columnar reports is generated and loaded into the user's manual file 42. A sample of the column headings for the report is provided. If column headings do not fit into 80 column wide lines, the continuing lines are broken and printed below on the document.

FIG. 14 is a flow chart of the Detail Report Overview routine. This routine provides the ability to document various detail reports.

FIG. 15 is a flow chart defining the Exception Report Overview Routine. In an initial step 176, an exception report introduction is provided. The Data Dictionary Description routine is called in a step 178 for the purpose of listing each data element name along with related edit rules.

Figure 16:
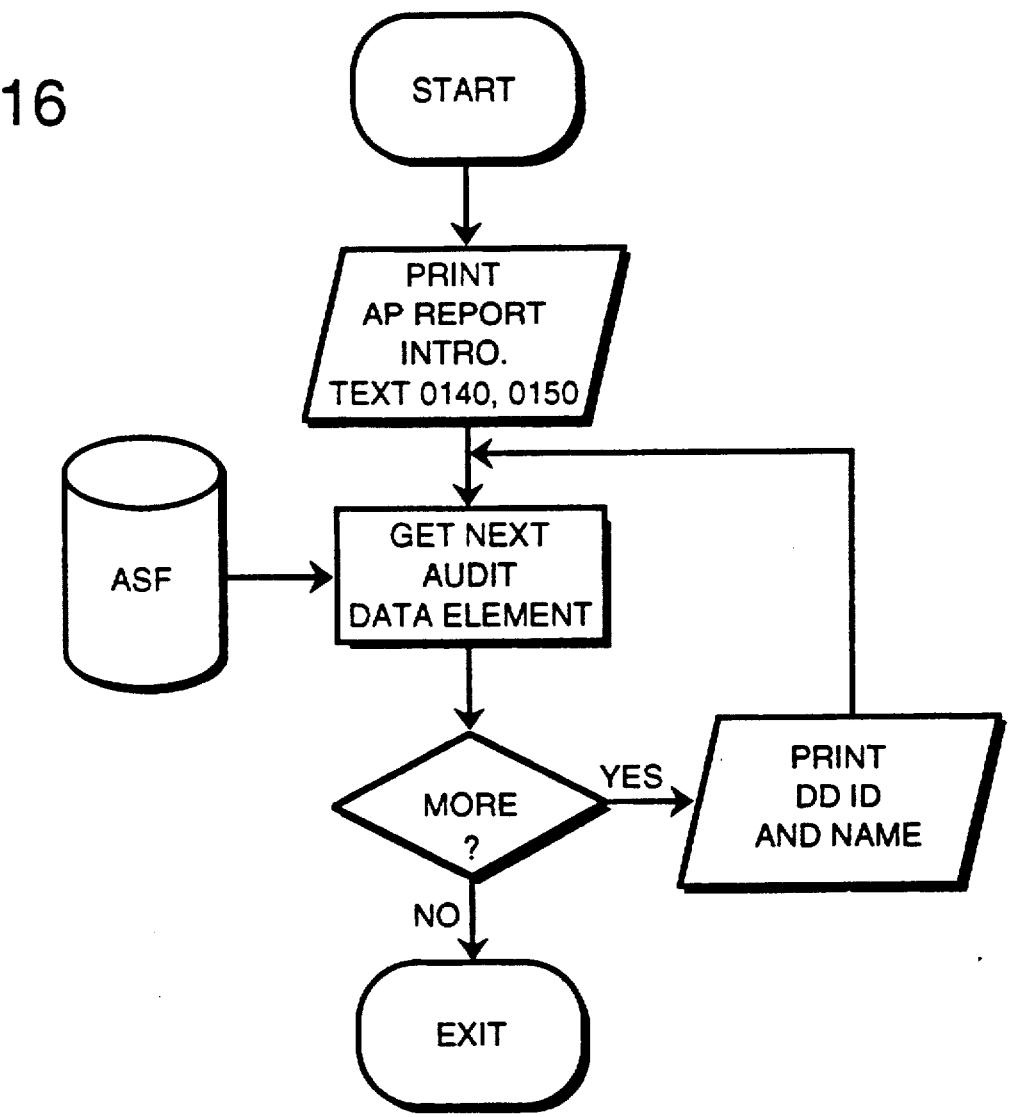
FIG. 16 is a flow chart of a routine which defines the process of documenting audit functions for the application.

FIG. 16 is a flow chart of the Audit Report Overview routine. The audit report provides information concerning statistics for various specified data elements. Each data element is identified and listed under text which indicates that audit operation has been performed.

Figure 17:
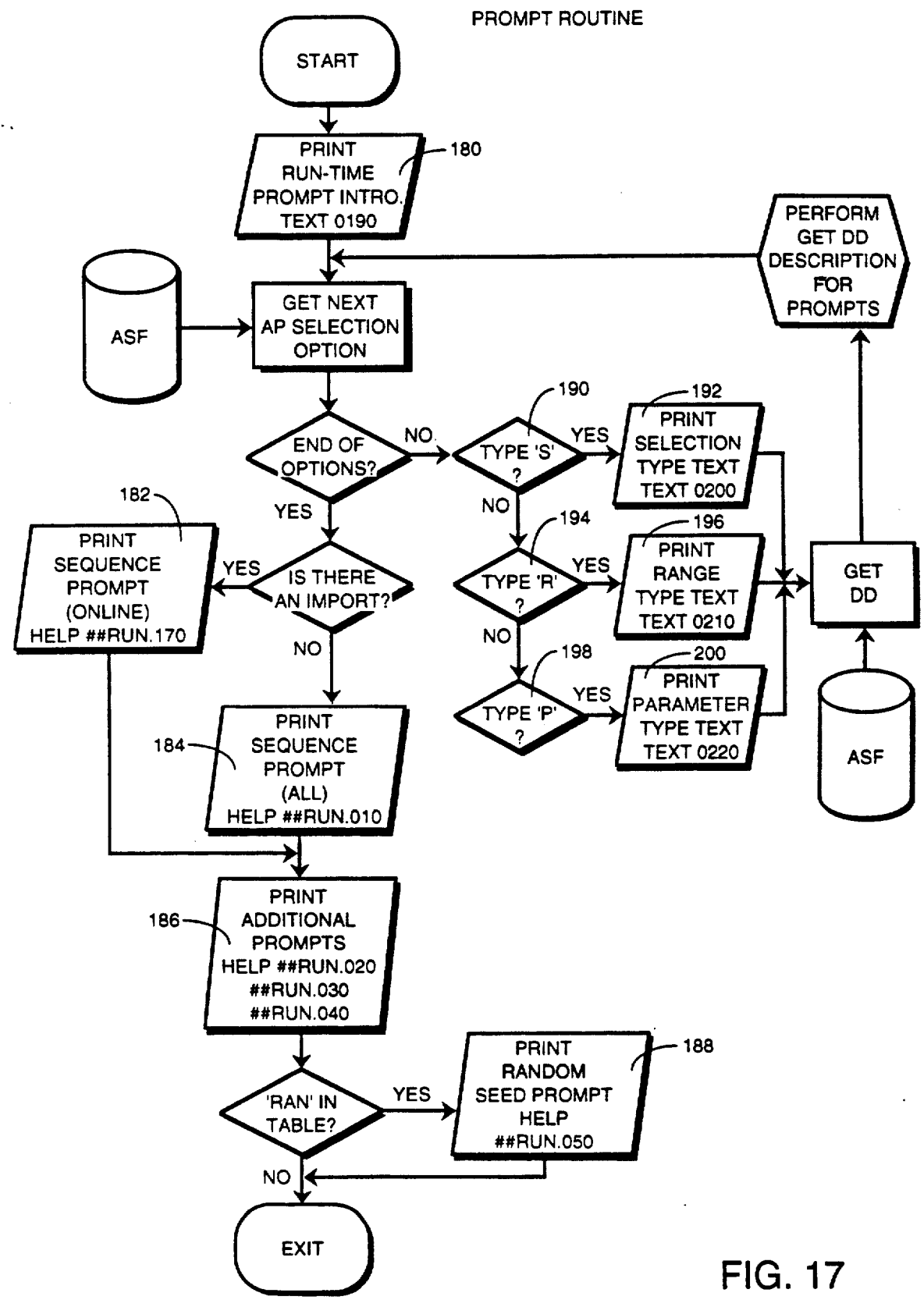
FIG. 17 is a flow chart of a routine which defines process of creating run-time prompt documentation.

FIG. 17 is a flow chart of the Prompt Routine routine. This routine creates the portion of the user's manual that identifies run-time prompts. In accordance with the present apparatus and method, run-time prompts which are dynamically generated when the application package is being executed are fully documented.

In a step 180, introductory text for a run-time prompt introduction is transferred to the user's manual output file 42 for subsequent printing. The run-time prompt routine of FIG. 17 then lists the various run-time prompts that are available and provides rules for responses thereto.

The prompts can be of two types. Selection options that are specified by the application developer are one type. If the APPLAUD language has been used by the application developer, the options are specified in the "AP" table in the STE file. As a second type are specific prompts that are defined by the features used within the particular application. These prompts are documented through the use of prestored text from the help file 40.

The text from the help file 40 is retrieved and loaded into the user's manual output file for subsequent printing in a plurality of steps 182 through 188. In the event that selection options are available, they are detected and printed in a plurality of steps 190-200.

FIG. 18 is a flow chart of the Report Prompt routine which is used to create other portions of the run-time prompt section of the user's manual. The report prompt routine of FIG. 18, in a step 202, determines which types of function tables are used within the present application.

The type of function tables define both the types of reports that are available as well as whether or not import files and export files are present. In a set of steps 204-212 of the Report Prompt routine, a determination is made as to which type of report is presently being considered. In a plurality of related steps 214-222, the associated text is retrieved and loaded into the user's manual output file 42 for subsequent printing.

When prompts for all of the tables have been printed, in a plurality of steps 224-230 text is generated for the manual output file 42 to document the necessary procedures required to run the application. Further, the routine of FIG. 18 also determines, in a plurality of steps 232-238, if there are export table files present associated with the application and generates character strings for the user's manual file identifying same. In steps 240 and 242, the routine determines whether there are export file tables or import file tables and then generates strings of characters for the user's manual output file 42 introducing the detailed specifications of the export file and import file layouts.

FIG. 19 is a flow chart of a routine which is used to find all of the import file and export file tables. It also calls the import file format routine, FIG. 20, in a step 250 and the export file format routine, FIG. 21, in a step 252 for both import file and export file format documentation.

Figure 20:
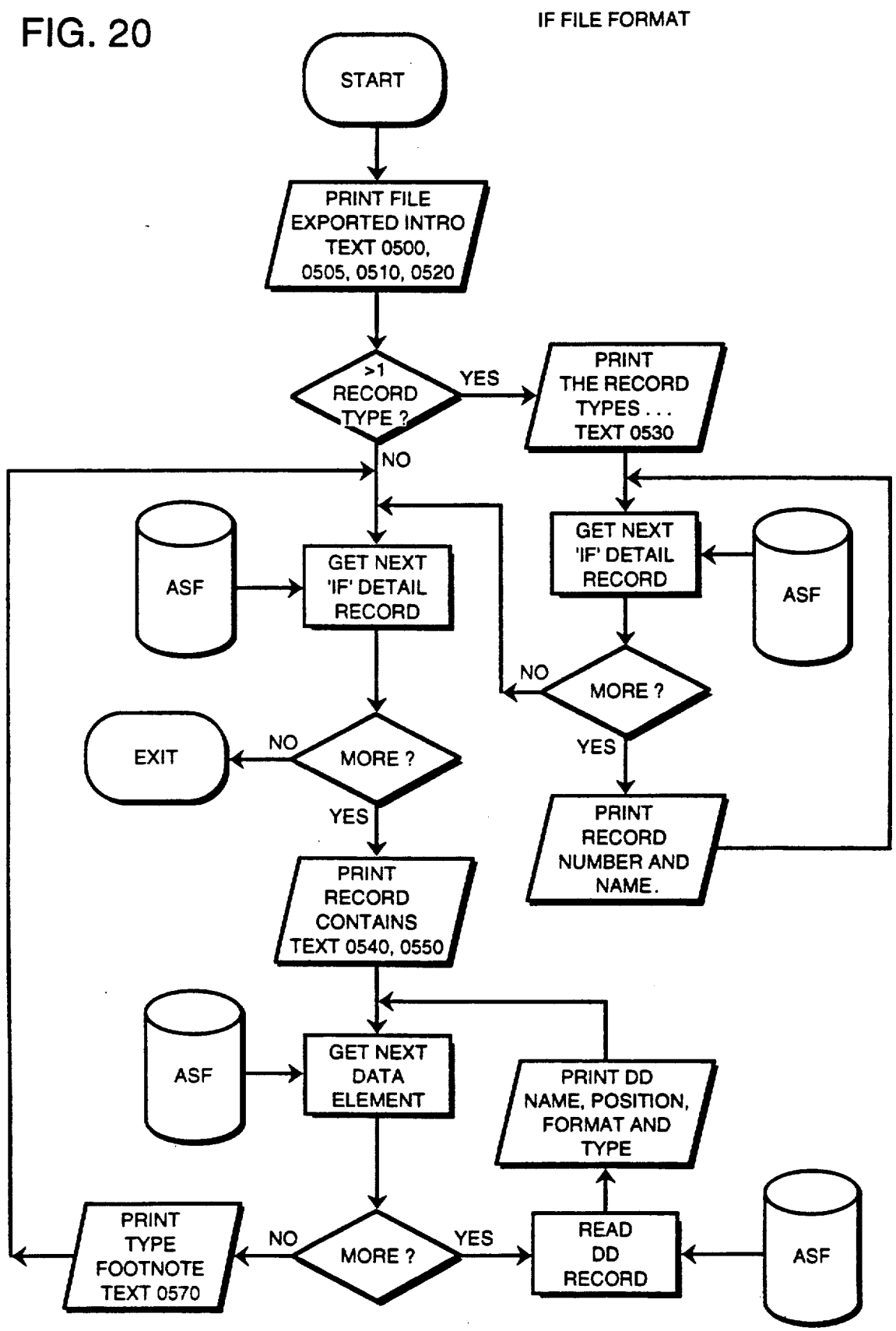
FIG. 20 is a flow chart of a routine which defines the process of generating import file format specification text for the user's manual output file.

The flow chart of FIG. 20 defines the IF File Format routine. This routine prints the import file format specification. The specification starts with basic information about the import file such as type of characters, ASCII/EBCDIC, record length, and so on. Character streams are generated to identify the data element name, position, format and data type and loaded into the user's manual output file 42 for subsequent printing. Character strings are also generated to produce a footnote in the output user's manual which illustrates the various data type codes.

Figure 21:
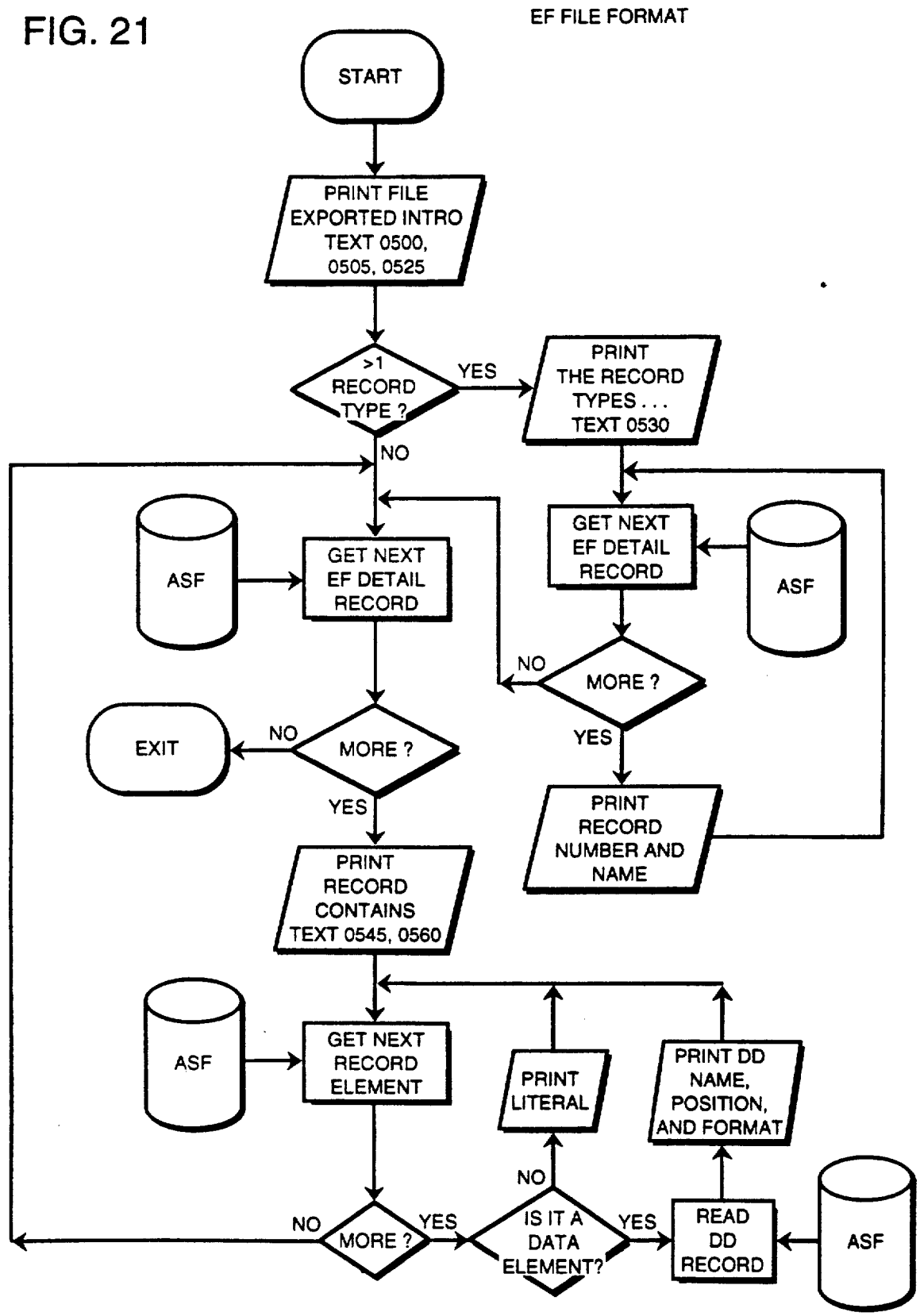
FIG. 21 is a flow chart of a routine which defines the process of generating export file format specification text for the user's manual output file.

FIG. 21 is a flow chart of the Export File Format routine. This routine generates character strings for the user's manual output file 42 of the export file format specification. This specification starts with basic information about each export file such as record length. Subsequently in the routine, each data element in each input file record is located. Character strings are generated for the user's manual output file 42 which identify data element name and position format on a page of the user's manual.

Figure 22:
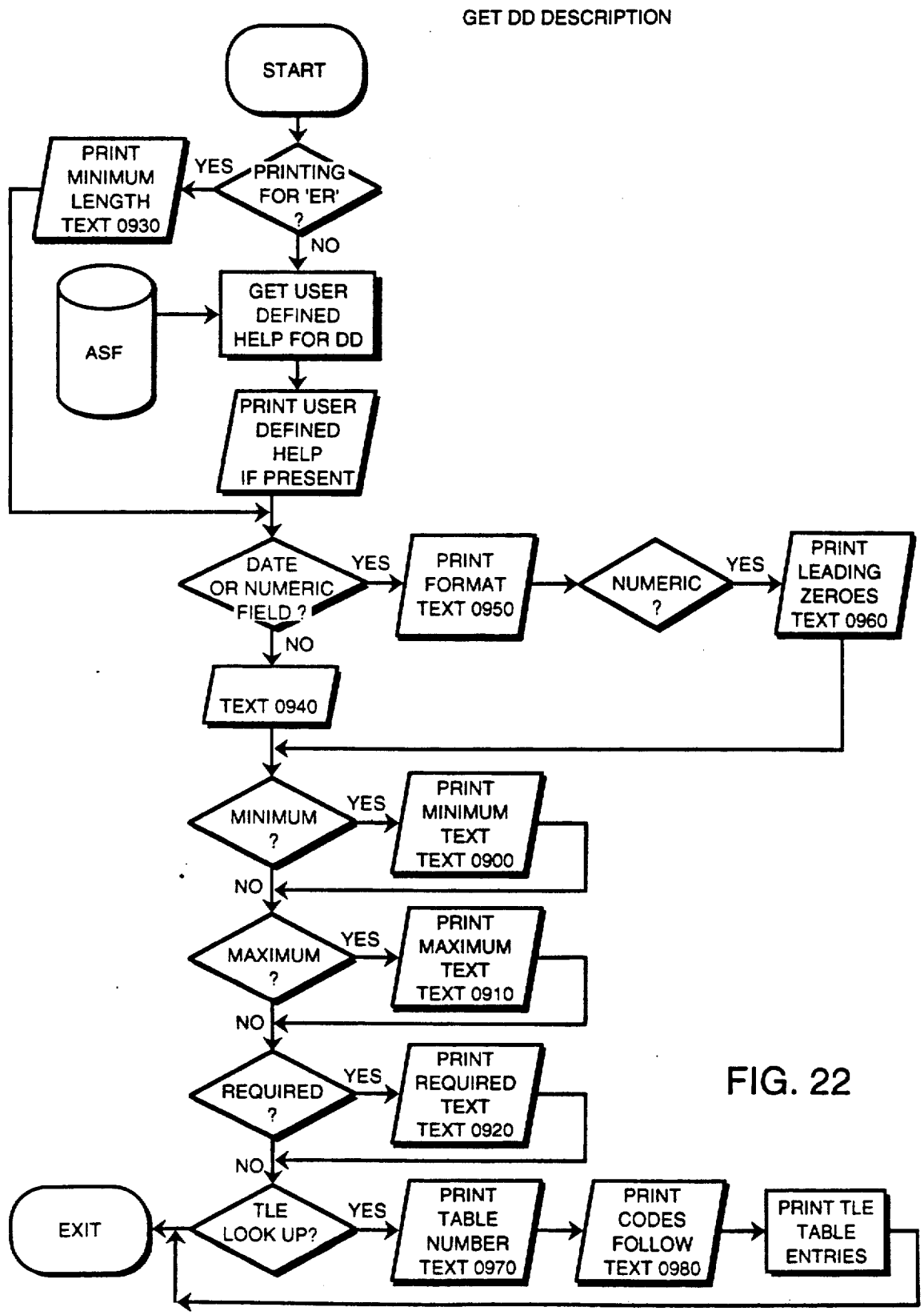
FIG. 22 is a flow chart of a routine which defines the process of generating text, documenting run-time prompts and on-line data entry screen fields along with exception report variables for the application.

FIG. 22 is a flow chart of the Data Definition Description routine. This routine is used in documenting run time prompts associated with a specific application, on-line data entry screen fields and exception report variables. The routine of FIG. 22 obtains information from the data definition table. It then generates character strings for the user's manual output file 42 for the printing of user define help information, as well as, format information and keyboard related information. Keyboard information includes instructions as to how information is to be entered at certain fields and also specifies rules such as minimums, maximums, minimum length table editing.

Using the previously described system along with the described data files and manual generation program 44, a complete and extensive user guide or manual of an application package can be automatically produced. To further illustrate the functioning of the present system and method, several additional exhibits have been provided. Exhibit C is a listing of an exemplary application specification file, corresponding to the application table file 34, previously discussed. Exhibit D is a listing of an exemplary user's manual control file, corresponding to the user's manual control file 36, previously discussed. Exhibit E is a listing of a portion of an exemplary help file, corresponding to the help file 40 previously discussed. An Exhibit F is a listing of a user's manual generated in accordance with the present system and method.

With respect to FIG. 4, an overview Display File 32 (illustrated in phantom) includes the overview section for each application included in the user's manual output file 42. The appropriate overview section from the file 32 can automatically be displayed for a user. When viewing a menu identifying various applications, if the user selects an application and depresses the "Help" key, the overview from the file 32 for that selected application will be displayed. Contents of the overview display file are produced in steps 124-136, FIG. 10; steps 138-146, FIG. 11A; and steps 156-167, FIG. 12. An exemplary listing of an overview display file is included in Exhibit G.

Further in accordance with the invention, a software development tool is provided which can be used to generate a sequence of displayable user assisting guide boxes while a given application is being executed. In accordance with this aspect of the invention, a plurality of guide box records can be generated by an application developer.

Table 5 discloses the lay-out of each of the guide box descriptors. The first information line of each descriptor includes the identifier for that particular guide box. The second line defines the line on the screen where the top line of the guide box is to be displayed. The second line also includes the column on the screen where the left side of the guide box is to be displayed. The third, fourth and fifth lines of the descriptor indicate the next guide box identifiers based on information keyed in by the user, listed on a corresponding line of the descriptor from Table 5. Additional or fewer lines can be used as needed. The subsequent lines of text in the record of Table 6 are lines of text. These lines of text can be up to 76 characters wide and up to 23 lines long.

Some exemplary samples of guide box messages are illustrated in Table 6. If desired, when displayed, the message can be surrounded by a delineating rectangular outline.

One of the advantages of the guide box development and display scheme described herein is that it is not necessary to recreate any screen contents for the corresponding application. The screen contents for the application are automatically generated as the application is actually being executed at the time the guide box sequences are being displayed. The guide boxes are in fact, overlays to the actual screen displays for a given application.

A further advantage of the present system is in more effective long-term maintenance. Minor application modifications that do not alter the displayable screens have no impact on the guide box generation or display process.

Further, the system provides the ability to turn off the displayable guide boxes at various points in the process. A user can then use the system on their own at various points in the tutorial process. A user can then signal when the guide feature is to be turned back on again subsequently.

Figure 23:
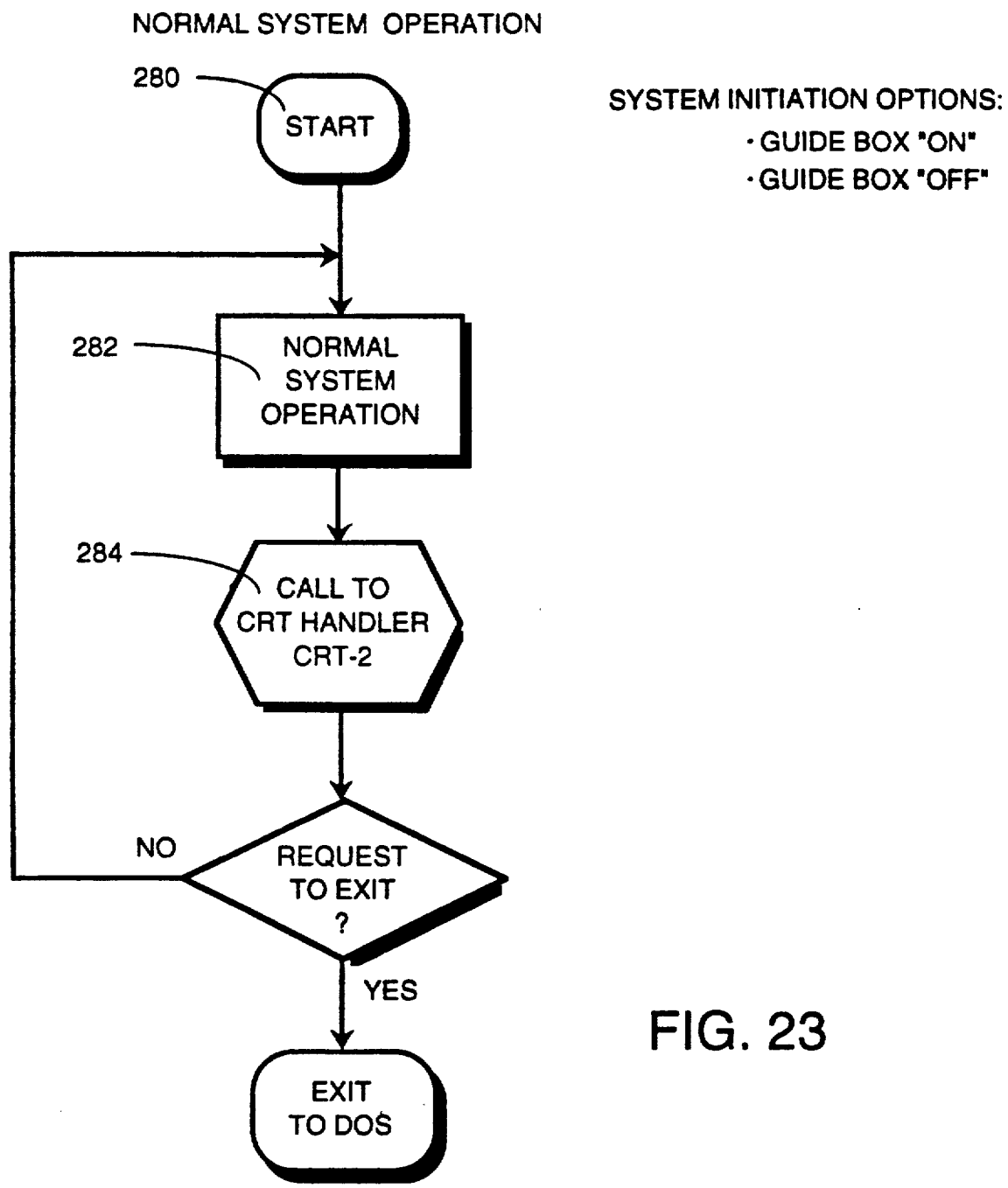
FIG. 23 is an overall flow chart of an executing application package.

FIG. 23 illustrates in an overall fashion, system operation with the guide box facility. In a step 280, the application package is initialized prior to execution. Initialization options include turning the guide box facility on or off. This facility is automatically turned on by means of a command which initiates the system tutorial capability. It is turned off automatically during normal system operation.

Normal system operation is indicated in a step 282. In this step, all normal functions of the application are functioning. The guide box display capability does not impair, in any way, normal functioning of the application package. In a step 284, during normal processing, the CRT handler program is called. The CRT handler, illustrated in FIG. 24, optionally generates the guide box display.

Figure 24:
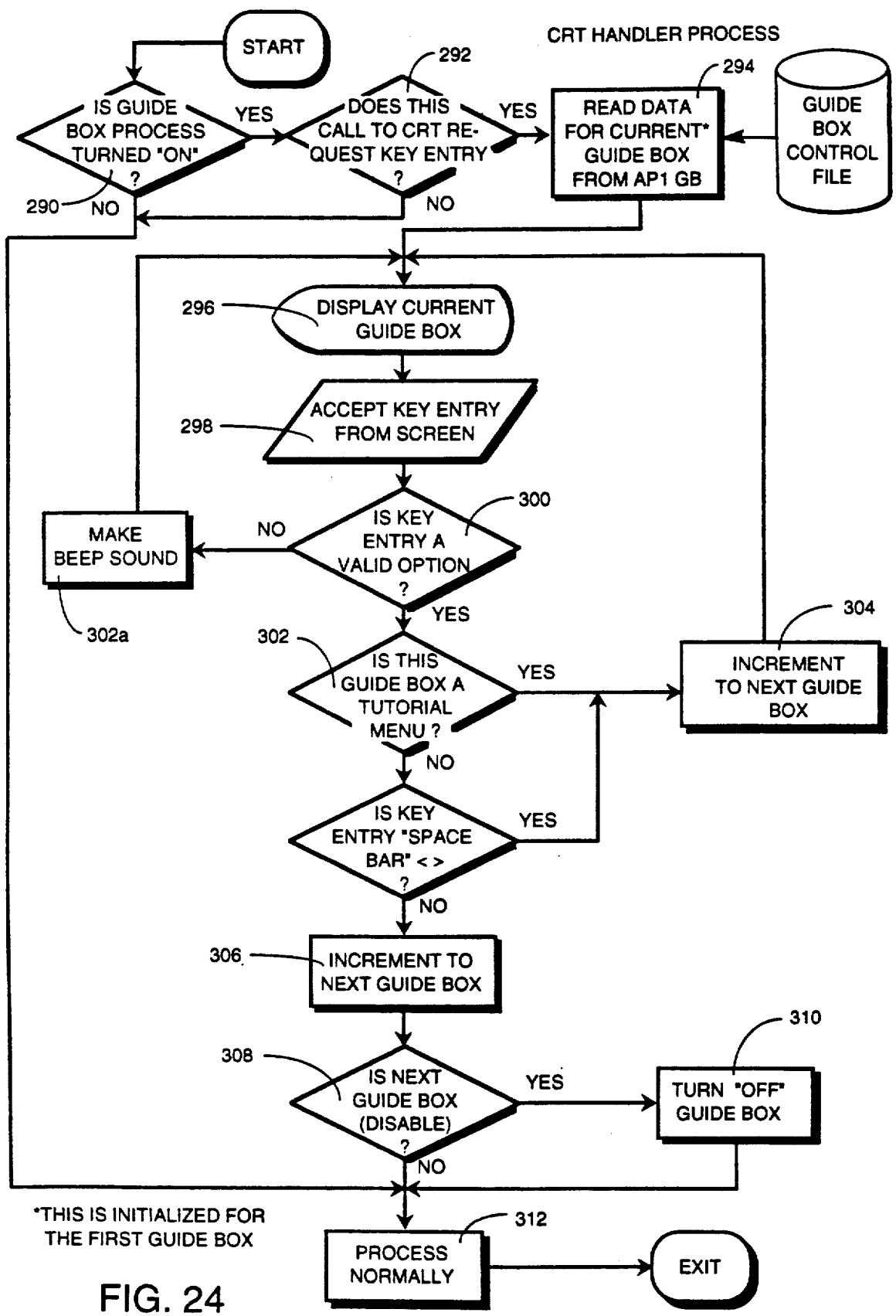
FIG. 24 is a flow chart of a routine usable to overlay a user assisting guide box over a portion of a displayed screen.

With respect to FIG. 24, in a step 290, the CRT handler determines whether or not the guide box display capability is turned on or off. The guide box display capability is used only in connection with displayed screens that receive operator input. This condition is checked in a step 292. If the appropriate screen is to be displayed, the current guide box record is read from the guide box storage file in a step 294.

The application package is initialized for the first guide box. In a step 296 the current guide box is displayed at the location on the screen identified therein, see Table 5. In a step 298, key entry for the data field is received from the user. In a step 300, the entered information is examined to determine whether or not it is acceptable in view of the possible valid entries which are identified in the corresponding guide box record, see Table 5. If not, in a step 302, invalid entries are identified to the user using audible feedback. An opportunity is then given to the user to enter an acceptable keystroke or keystrokes.

Assuming that the entered information is acceptable, in a step 302, the process determines whether or not a tutorial menu is being displayed. If so, the keystrokes entered in the step 298 are examined and again compared to the corresponding guide box record information to determine which is the next guide box is in a step 304.

Alternately, the next guide box based on the entered information and the guide box identifiers in the corresponding record is then determined in a step 306. In a step 308, a determination is made as to whether or not the guide box display process has been disabled by the operator. If so, the guide box display process is turned off on a step 310. Then, normal processing of the application is reinitiated in a step 312.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

TABLE 1

CONTROL FILE COMMANDS
The User's Manual control file (AP1UG) contains the following set of commands. They control the process of creating the User's Manual. The commands include the following:

| COMMAND | PARAMETERS | ACTION |
|---|---|---|
| $$PAG | | New page |
| $$SECH------H | H = Heading (60 characters) | New section and new page |
| $$SUBH------H | H = Heading (60 characters) | New sub-section and new page |
| $$SEXNNN | NNN = ID number (must be numeric, i.e., 001) | Exclude from this point based on ID option (entered or determined internally) |
| $$EEXNNN | NNN = Report prompt ID number | Exclude to this point based on report prompt |
| $$TLE | | Print list of TL TABLES |
| $$DBL | | Print list of data bases user may access |
| $$CD | | Print "CD/dddddd <And press ENTER>" where dddddd is the current directory |
| $$LO | | Print logon screen |
| $$ME1 | | Print user's first menu |
| $$MENnnnnnnnn | nnnnnnnn = menu name | Print menu nnnnnnnn |
| $$MENALL | | Print all menus user has access to |
| $$APL | | Print list of Applications user |

TABLE 1-continued
CONTROL FILE COMMANDS
The User's Manual control file (APIUG) contains the following set of commands. They control the process of creating the User's Manual. The commands include the following:

| COMMAND | PARAMETERS | ACTION |
|---|---|---|
| SSAPD | | may access Print Application detail information (for Applications user may access) |
| SSDBS* | | Print data base sequence options (sort and on-line) |
| SSDBO* | | Print data base on-line sequence options |
| SSDDD | | Print data dictionary |
| SSTLD | | Print the contents of all TL tables |
| SSFILnnnnnnnn | nnnnnnnn = file name | Insert text file named nnnnnnnn.FIL (Note: Text file may contain additional commands as well as explanatory text) |

*These may be used only in the Help file since the data base from the current application is used.
Note:
Any line in the Control File (APUG) that does not being with "SS" is considered as text and is inserted directly in the User's Manual file (APRUG).

TABLE 2
USER'S MANUAL CONTROL FILE EXCLUSIONS
The Commands "SSSEXnn" and "SSEEXnn" specify "exclusions". Exclusions allow a portion of the control file (APIUG) to be "excluded" (i.e., ignored) under varying circumstances. "SSSEXnn" starts an exclusion and "SSEEXnn" ends the exclusion. All text and Commands on the control file (APIUG) is excluded if the condition is met. Each exclusion is keyed by a different number (i.e., "nn" above).
Exclusions include the following:

| EXCLUSION NUMBER | DESCRIPTION |
|---|---|
| 092 | Exclude if no TL tables. |
| 093 | Exclude if PRINT is on user's menus. |
| 094 | Exclude if RBLD is not on user's menus. |
| 095 | Exclude if TBL is not on user's menus. |
| 096 | Exclude if TLE is not on user's menus. |
| 097 | Exclude if PRINT is not on user's menus. |
| 098 | Exclude if the Application menu is not more than one screen or if the user does not have access to the Application menu. |
| 099 | Exclude if the user does not have access to more than one menu. |

TABLE 3
TEXT ELEMENT VARIABLE DEFINITIONS FOR TABLE 4

| CODE | DESCRIPTION |
|---|---|
| A | Application Table Name |
| B | Application Description |
| C | Primary Data Base Name from Application Table |
| D | Description of Data Base Identified in "C" |
| E | Subordinate Data Base Name Found in "PUT" Operation |
| F | Description of Data Base Identified in "E" |
| G | Current Report File Name |
| H | Current Report File Description |
| I | Import File Record Length |
| J | Import File Record Number |
| K | Import File Record Name |
| L | Export File Record Length |
| M | Export File Record Number |
| N | Export File Record Name |
| P | Number of Detail Screens in an OL Application |
| Q | Current OL Detail Screen Number |
| R | Minimum Value Defined for Current DD |
| S | The Name of the DD Specified as the Minimum for the Current DD |
| T | Maximum Value Defined for Current DD |
| U | The Name of the DD Specified as the Maximum for the Current DD |
| V | The Number of the Table Look-Up Table to Use When Editing the Current DD |
| W | Minimum Length Defined for the Current DD |
| X | Size Defined for the Current DD |
| Y | Format for the Current DD |
| Z | Current DOS Directory |

TABLE 4
TEXT ELEMENTS FOR USER MANUAL

| CODE | DESCRIPTION |
|---|---|
| 0005 | "OVERVIEW" |
| 0010 | "The AAAAAAAA Application (BBB . . .)" |
| 0020 | If on-line and update: "Provides on-line data entry/inquiry for the" If on-line and no update: "Provides on-line inquiry into the" If import: "Provides data update from an imported file for the" If reports and update: "Provides calculations and update for the" If reports and no update: "Processes the" |
| 0030 | "DDDDDDDD Data Base (CCC. . .)" |
| 0040 | "The Application also updates the" |
| 0060 | If only one subordinate data base: "EEEEEEEE Data Base (FFF. . .)" If more than one subordinate data base: "following Data Bases EEEEEEEE (FFF. . .), EEEEEEEE (FFF. . .), . . ." |
| 0070 | "The columnar report GGGGGGGG (HHH. . .) provides the ability to print the following data element(s):" |
| 0080 | "Note: The order of the data elements on the GGGGGGGG report (HHH. . .) will vary based on the report sequence selected. Also, if the sequence selected contains Data Elements not defined above, they will be added to the report". |
| 0090 | "The 'TOTALS' lines contain averages for the following Data Element(s):" |
| 0100 | "The detail report GGGGGGGG (HHH. . .) provides the ability to list" |
| 0110 | "All data elements in the CCCCCCCC Data Base (DDD. . .)" |
| 0120 | "The following data element(s):" |
| 0130 | "The exception report GGGGGGGG (HHH. . .) provides edits for the following data element(s):" |
| 0140 | If AUD operations: "The GGGGGGGG report |

TABLE 4-continued
TEXT ELEMENTS FOR USER MANUAL

| CODE | DESCRIPTION |
|---|---|
| | (AUDIT/CONTROL REPORT) |
| | If no AUD operations: "The GGGGGGGG report (CONTROL REPORT)" |
| 0150 | "Will include detailed field audit information for the following data element(s):" |
| 0185 | "RUN-TIME PROMPTS" |
| 0190 | "The following list shows prompts that are displayed at run-time for the Application (BBB...). The responses to these prompts apply to all functions in the Application. Your responses to these prompts will be shown on the left side of the report(s) produced by this Application. The prompts are:" |
| 0200 | "Enter data to select only matching records, leave blank to select all." |
| 0210 | "Enter data to select a range of records. Note: If "FROM" or "TO" is left blank the range will start/end with the lowest/highest value." |
| 0220 | "This is a parameter used for Application processing." |
| 0300 | If 'CR' report: "The Columnar Report" <br> If 'DR' report: "The Detail Report" <br> If 'ER' report: "The Exception Report" <br> If 'EF' report: "The Export File" <br> If 'IF' report: "The Import File" |
| 0310 | "GGGGGGGG (HHH...) displays the following prompts:" |
| 0320 | "After entering data for all of the prompts, the Command Box will be displayed. To run the Application select "X" (Execute Request) on the Command Box and press ENTER" |
| 0325 | "OUTPUT" |
| 0330 | If 1 report generated: "This Application produces a report file named as follows:" <br> If more than 1 report generated: "This Application produces report files named as follows:" |
| 0340 | If 1 export file created: "And an export file named:" <br> If more than 1 export file created: "And export files named:" |
| 0350 | "Where "sss" is the report suffix specified above." |
| 0360 | "The detail format for the" |
| 0370 | If both import and export files: "import/export files" <br> If more than 1 export file: "export file" <br> If 1 export file: "export file" <br> If more than 1 import file: "import files" <br> If 1 import file: "import file" |
| 0380 | "begins on the next page." |
| 0500 | "The file imported" |
| 0501 | "The file exported" |
| 0505 | "by this Application (BBB...) has the following characteristics:" |
| 0510 | If file type = 'A' "TYPE: ASCII" <br> If file type = 'E' "TYPE: EBCDIC" <br> If file type = 'B' "TYPE: ASCII without carriage return/line feed" |
| 0520 | "RECORD LENGTH: IIII" |
| 0525 | "RECORD LENGTH: LLLL" |
| 0530 | "The file contains the following record types:" |
| 0540 | "Record JJ (KKK...) contains the following data:" |
| 0545 | "Record MM (NNN...) contains the following data:" |
| 0550 | " DATA   RECORD <br> "ELEMENT   POSITION   FORMAT   TYPE *" |
| 0560 | " DATA   RECORD <br> ELEMENT   POSITION   FOR-MAT " |
| 0570 | "* Type codes are: ID = IBM display, IP = IBM packed, IB = IBM binary" |
| 0600 | "The following types of screens are displayed by this Application:" |
| 0610 | "* SEQUENCE AND MODE SPECIFICATION SCREEN - This is used to select the on-line sequence and the mode (Add/Update/Browse)." |
| 0620 | "* UPDATE KEY ENTRY SCREEN - For Add and Update modes, this is where the key data elements are entered." |
| 0630 | "* STARTING/ENDING KEY SCREEN - This allows users the ability to begin and/or end the Browse Inquiry feature at any place in the Data Base." |
| 0640 | "* BROWSE INQUIRY SCREEN - This allows users to view data for many records on the screen at once. Data is presented in spreadsheet format." |
| 0650 | "* DETAIL DATA SCREEN - This contains all detail data elements for a specific record." |
| 0660 | "The following outlines the contents and use of each on-line Application screen:" |
| 0670 | "SEQUENCE AND MODE SPECIFICATION SCREEN <br> When this Application is initiated, this screen is displayed. It lists all available on-line sequences and modes. This screen requires entry of the following:" |
| 0680 | "UPDATE KEY ENTRY SCREEN <br> Update mode requires specification of a 'Key'. The Key entry screen requests entry of from one to four 'Key' data elements. The 'Key' data elements are determined by sequence selected on the prior screen. All data elements in the sequence become the 'Key' fields. This screen requires entry of all Key fields. Control is then passed to the entry of all Key fields. Control is then passed to the Detail Data Screen. Fields displayed on this screen depend on the sequence selected. They include the following: |
| 0690 | "STARTING/ENDING KEY SCREEN <br> In browse mode this screen is displayed. It provides users the optional ability to start and/or end the Browse inquiry feature at a specific place in the Data Base. It alllows entry of all key fields for the sequence selected. <br> If you leave these fields blank, the Browse Inquiry will start/end the browse at the beginning of the Data Base. If you enter data, it will start/end at the first matching record. If no exact match exists the Browse Inquiry feature will start/end with the next highest key. Fields displayed on this screen depend on the sequence selected. They include the following: |
| 0700 | "BROWSE INQUIRY SCREEN <br> "This screen shows data from the ARMASTER Data Base (ACCOUNTS RECEIVABLE MASTER) in spreadsheet style. The cursor is placed on the left side of the screen and the rest of the screen contains columns of data from the Data Base. Each line of the screen represents data from a different record. Data displayed includes the following:" |
| 0710 | "Note: The order of the data elements displayed on the screen will vary based on the Data Base sequence selected. The key fields from the sequence selected will automatically be inserted at the beginning of the screen." |
| 0720 | "Options on the screen include the following:" |
| 0730 | "DETAIL DATA SCREEN" |
| 0740 | "This screen provides the ability to view all data for one specific record." |
| 0750 | "The Detail Data Screen varies based on the mode:" |
| 0760 | "* ADD - The screen will always be displayed without any existing data. It is used to enter data for the record to be added." |
| 0770 | "* UPDATE - The screen may or may not display existing data. If it displays data, the record already exists and this screen can be used for update. If this screen doesn't display data, it is prompting for data for the record to be added." |
| 0780 | "* BROWSE - The screen will always display data. It update mode is allowed, the data can then be updated." |
| 0790 | "The left side of the browse screen shows data element names. The data in the CCCCCCCC Data Base (DDD... is shown in the middle of the screen. If any data elements are edited using a TLE (Table Look-Up) table, the result description is shown on the right side of the screen. Data entered/displayed on this screen includes the following:" |
| 0800 | "This Application consists of PP screen(s) of data on the detail screen." |
| 0805 | "SCREEN QQ" |
| 0810 | If more than 1 detail screen: "The screen layout for screen QQ is as follows:" <br> If only 1 detail screen: "The screen layout is as follows:" |

TABLE 4-continued
TEXT ELEMENTS FOR USER MANUAL

| CODE | DESCRIPTION |
|---|---|
| 0820 | If Add or Update modes allowed: "Data entered/displayed on"<br>If Browse mode only: "Data displayed on" |
| 0830 | If only 1 detail screen: "this screen"<br>If more than 1 detail screen: "screen PP" |
| 0840 | "includes the following:" |
| 0850 | "Screen options are as follows:" |
| 0900 | If minimum is a literal: "The minimum allowed value is RRRRRRRR."<br>If minimum is another DD: "It may not be greater than SSSSSSSS." |
| 0910 | If maximum is a literal: "The maximum allowed value is TTTTTTTT."<br>If maximum is another DD: "It may not be less than UUUUUUUU." |
| 0920 | If text prior to this: "It is a required field."<br>If no text prior to this: "This is a required field." |
| 0930 | "This field must be at least WW character(s) long." |
| 0940 | If size is 1: "This is a 1 character field."<br>If minimum length not defined: "This field can contain up to XX character(s)."<br>If minimum length is same as size of field: "This field must contain XX character(s)."<br>If minimum length is less than size of field: "This field can contain WW to XX characters." |
| 0950 | "This should be entered in the format YYYYYYYY." |
| 0960 | If no decimal places: "(Leading zeros are not required)."<br>If decimal places: "(Leading and trailing zeros are not required)." |
| 0970 | "This field is edited on TLE Look-Up table VV." |
| 0980 | If 10 or fewer TLE entries: "Valid codes are as follows:"<br>If more than 10 TLE entries: "Valid codes include the following:" |
| 1000 | "CD/ZZZZZZ <And press ENTER>" |

TABLE 5
GUIDE BOX DESCRIPTOR LAYOUT

The Guide Box Command Language instructions are located in a computer file with multiple records. The descriptor layout is as follows:
```
1AAAAAAAA
2BBCC
3DDDDDDDD EEEEEEEE
3FFFFFFFF GGGGGGGG
3HHHHHHHH IIIIIIII
JJJJJJJJJJJJJJJJJJJJJJJJJJJJJJJJJJJJJJJJ
KKKKKKKKKKKKKKKKKKKKKKKKKKKKKKKKKKKKKKKK
LLLLLLLLLLLLLLLLLLLLLLLLLLLLLLLLLLLLLLLL
```

| where: | | |
|---|---|---|
| | AAA... | Is the ID of this Guide Box. |
| | BB | Is the line on the screen where the top line of the Guide Box is displayed. |
| | CC | Is the column on the screen where the left side of the Guide Box is displayed. |
| | DDD..., FFF... and HHH... | Indicates the "next" Guide Box ID's (any number are allowed). Based on the data keyed in EEE..., GGG..., and III... the system determines which will be the next Guide Box displayed. (Guide Box ID "<DISABLE>" disables the Guide Box process). |
| | EEE..., GGG..., and III... | Lists all possible valid entries for this Guide Box (any number are allowed). If the data keyed into the system is invalid, the system "beeps" and requests entry again until one of the valid choices is entered. Coding of function and other keys for these fields is shown on Table 7 attached. |
| | JJJ..., KKK..., and LLL... | Are lines of text. There can be up to 23 lines of text up to 76 characters wide. The size of the Guide Box displayed is determined by the amount of text (i.e., number of lines and width) |

TABLE 6
EXEMPLARY GUIDE MESSAGES

The last line of the screen lists the active function keys. The function key designations displayed will change depending upon which APPLAUD function is currently being accessed. The operation of function keys will be explained later in this lesson.
Press Space Bar to continue.
You also can move the cursor to the top and bottom of a screen or menu by pressing Home and End.
Press End to move the cursor to the bottom of the screen.
Note the message "Page 1 of 2" at the bottom of the Menu box. This indicates that APMENU has more than one page of information.
Press PgDn to display the second page.
Also, you may key data while still viewing the Help screen. APPLAUD will automatically insert the data into the proper field.
Key "1" and press Enter.

TABLE 7
TUTORIAL GUIDE BOX
PROCESS CHART OF VALID ENTRIES

| CODE FOR VALID RESPONSE | VALID RESPONSE ALLOWED |
|---|---|
| < > | Space Bar |
| <ENTER> | Enter |
| <ESC> | Esc |
| <F1> | F1 |
| <F2> | F2 |
| <F3> | F3 |
| <F4> | F4 |
| <F5> | F5 |
| <F6> | F6 |
| <F7> | F7 |
| <F8> | F8 |
| <F9> | F9 |
| <F10> | F10 |

TABLE 7-continued

TUTORIAL GUIDE BOX
PROCESS CHART OF VALID ENTRIES

| CODE FOR VALID RESPONSE | VALID RESPONSE ALLOWED |
|---|---|
| <UP-ARROW> | Up-Arrow |
| <DOWN-ARROW> | Down-Arrow |
| <HOME> | Home |
| <END> | End |
| <PGUP> | PgUp |
| <PGDN> | PgDn |
| <CTRL PGUP> | Ctrl + PgUp |
| <CTRL PGDN> | Ctrl + PgDn |
| <RIGHT-ARROW> | Right-Arrow |
| <LEFT-ARROW> | Left-Arrow |
| <CTRL RIGHT-ARROW> | Ctrl + Right-Arrow |
| <CTRL LEFT-ARROW> | Ctrl + Left-Arrow |
| ALPHANUMERIC CHARACTERS | As predefined in descriptor |

EXHIBIT A

APPLAUD LANGUAGE REFERENCE MANUAL

APPLAUD

BY:

INTERNATIONAL CONSULTING ENTERPRISES, LTD.
10 SOUTH RIVERSIDE PLAZA
CHICAGO, IL 60606
(312) 454-3200

APPLAUD ™ COPYRIGHT © 1983, 1984, 1985, 1986, 1987, 1988

INTERNATIONAL CONSULTING ENTERPRISES, LTD. AND JAMES HEMPLEMAN

This document and the related software contains valuable trade secrets and proprietary information of International Consulting Enterprises, Ltd. and James Hempleman and is protected by federal copyright law. It may not be copied or distributed in any form or medium, disclosed to third parties, or used in any way other than as specified in the APPLAUD License Agreement, except with the prior written permission of International Consulting Enterprises, Ltd. and James Hempleman.

APPLAUD is a trademark of ICE, Ltd. IBM, IBM PC, XT, AT, PS/2 and PC DOS are trademarks of International Business Machines Corporation. MS DOS is a trademark of Microsoft. REALIA is a trademark of Realia, Inc. BTRIEVE is a trademark of Softcraft, Inc.

Acknowledgement: Paul A. Philip is the author of the dynamic CRT Handler used by APPLAUD.

APPLAUD User's Guide Process and Tutorial Guide Box Process - Patent Pending.

APPLAUD REPORT CONVENTIONS

As APPLAUD runs a report Application, it places the report on a file on the disk. This is the method APPLAUD uses for all reports. The advantages of this method include:

- The report can be printed at any time desired, on any printer, and as many times as necessary

- If the printer jams, the entire Application doesn't need to be run again

- If desired, the report can be archived in magnetic form rather than in printed form APPLAUD assigns report file names in a standard format as:

"APRttrr.sss" where:

- "tt" is the type of APPLAUD table that was used to create the report.

- "rrr" is a three character report ID identified in the specific APPLAUD table

- "sss" is a three character report suffix specified at run-time

Also, remember that your PC disk can't contain more than one report file with the same name. See "PRINT" in Section 6 for more information on deleting report files.

DATA ENTRY CONVENTIONS

Some of the information contained in the table fields must be in upper case characters. If you enter lower case characters into any of these fields, the characters will be automatically converted to upper case characters when the Enter key is pressed. Some of the required upper case fields are:

- APPLAUD table names
- One character codes (e.g., Data Type, Y/N responses, etc.)
- Report file names
- Commands The Command Box shown below provides different alternatives.
This Command Box is from an APPLAUD utility called TBL.

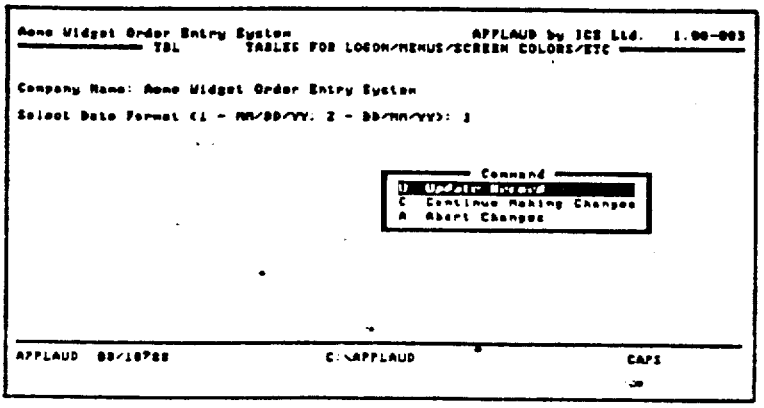

COMMAND BOX FOR TBL

This Command Box shows a different feature:

- U    Update Record - "Save" the data based on the changes made to this record or table.

The Update option *must* be selected to save the changes. *In APPLAUD no data is saved until you select Update on the Command Box.* This applies to:

- All APPLAUD Development mode tables

- All on-line screens that allow entry into your APPLAUD Data Bases

- All APPLAUD utility tables

Several additional options are presented on Command Boxes for APPLAUD Development mode. These allow access to "Table Commands" and "Line Commands". They also allow you to easily move between the various screens in multiple screen tables. These options will be discussed in detail in Section 3.

In *all* APPLAUD Command Boxes, the "Proceed" alternative is placed on the top line. This allows you to go forward with only one keystroke (i.e., press Enter).

The Command Box is automatically displayed when the *last* field is entered on any APPLAUD screen or table. It also can be displayed by pressing F10 after all required data is entered on the screen. A sample Command Box is shown on the screen below.

COMMAND BOX FOR RUNNING AN APPLICATION

The Command Box allows selection of options that affect system processing. Moving the highlighted bar and pressing Enter selects the desired option. You also can select the desired alternative by keying the letter/number of the option and pressing Enter.

Command Boxes provide different options for different types of APPLAUD features. The Command Box shown above allows initiation of an APPLAUD run-time Application. The options include:

- X    Execute Request - Run the Application.

- C    Continue Making Changes - Return to the underlying screen to allow changes to the run-time prompts.

- A    Abort Application - Abort the Application run and return to the system menu. (This is identical to pressing Esc on the underlying screen).

The Command Box

As you proceed with APPLAUD, you will use APPLAUD screens to perform activities such as:

- Entering data into APPLAUD Development mode tables;
- Adding and updating records in your APPLAUD Data Bases;
- Running APPLAUD Applications;
- Changing system parameters such as screen colors, date format, etc;
- And many more functions.

Each of these activities requires use of the APPLAUD *Command Box*.

APMENU, the APPLAUD Application Run-Time Menu, lists the Applications that are developed and ready to run. As you develop Applications, APPLAUD will automatically add Applications to this menu. APMENU is shown below.

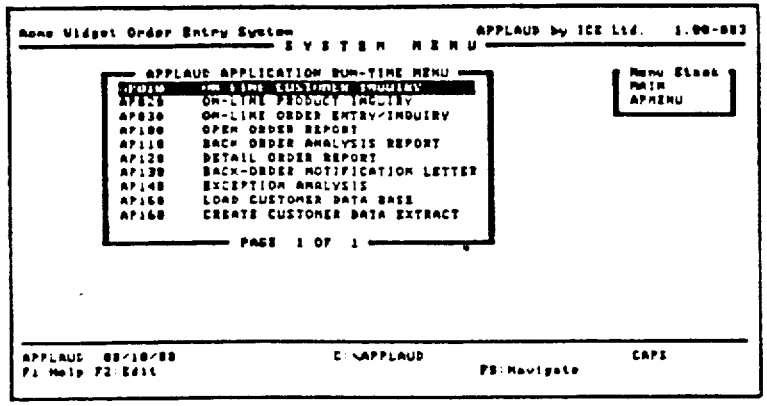

APMENU Screen

You can also create your own menus that limit access for specified users to only certain features. See "TBL" in Section 6 for more information on creating your own menus.

Menus are structured to help guide you through the APPLAUD features; however, if you already know the code of the system function, you may select the code at any menu. You do not need to be viewing the menu of the system function that you are selecting. This feature will become more valuable to you as you become more familiar with the system.

APPLAUD MENUS

APPLAUD is *menu-driven*. This means that to execute an APPLAUD function, you select a code from a *menu* (a list of functions on the screen).

System features are selected by keying the menu code of the desired option or by using the Up/Down Arrow keys to position a highlighted bar on the desired process. The selected process is then activated by pressing the Enter key.

When you logon, APPLAUD displays the Main System Menu. It is shown below.

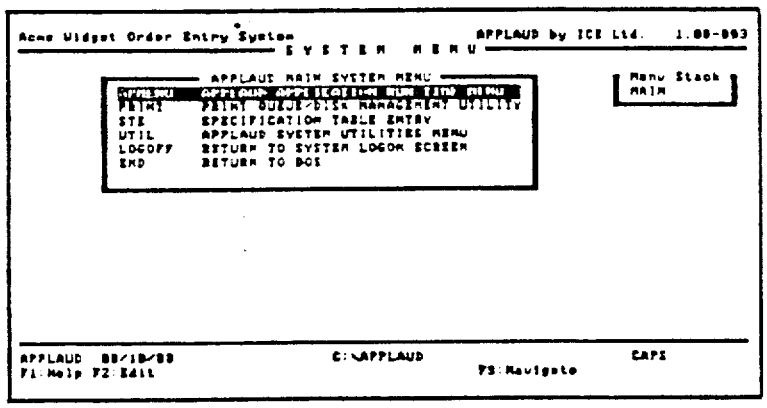

Main System Menu Screen

When you choose a system function from the main menu, you might go to a system feature or to another menu.

NUMERIC KEYPAD FUNCTIONS
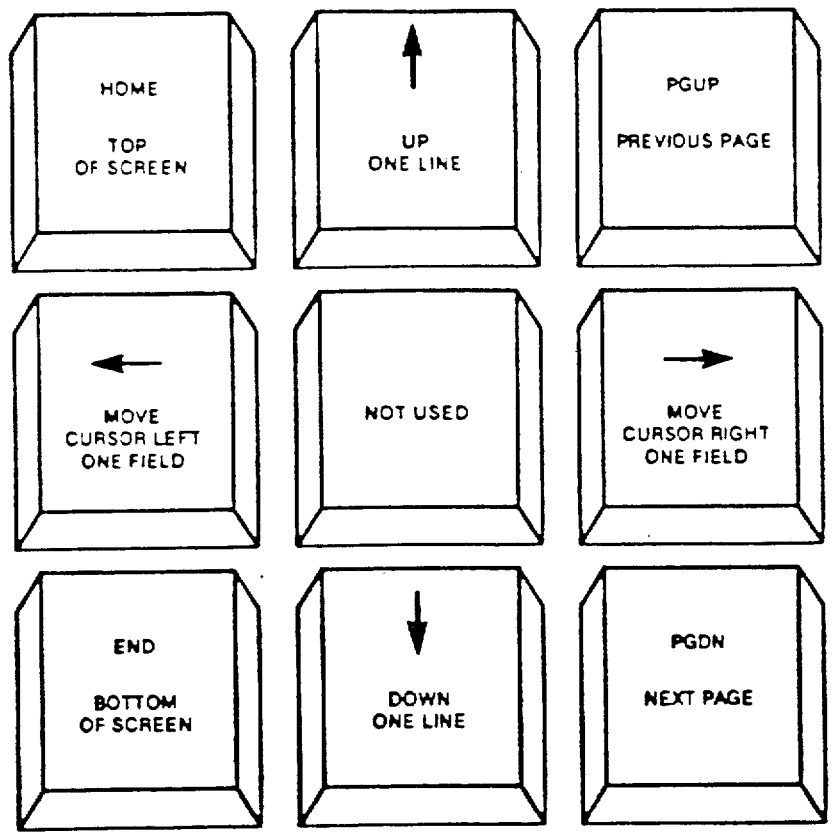

USING THE SYSTEM

| | |
|---|---|
| F2 | F2 will turn "Edit" mode on and off (see display on lower right of screen). This is used to modify or "Edit" a field that has already been keyed. Normally the Right-Arrow and Left-Arrow keys move the cursor to the next field to the right or left. In Edit mode, the Right-Arrow and Left-Arrow keys cause the cursor to move one character right or left. |
| F3 | This causes the system to return to the previous screen (it is only operational on those features where "Screen x of y" shows at the top of the screen). |
| F4 | This causes the system to display the next screen (it is only operational on those features where "Screen x of y" is displayed at the top of the screen). |
| F9 | This displays the system Navigation description. It shows how each of the special keys affect the operation of the cursor and screens. |
| F10 | This displays the Command Box. The Command Box allows the ability to update and delete records. Data entered into the system is not saved until "Update" is selected on the Command Box. In some areas of the system, the Command Box also allows additional functionality such as inserting lines, deleting lines, renaming and copying tables, etc. |

USING THE SYSTEM

| | |
|---|---|
| Del | The Delete key can be used to eliminate characters within a field. Each time the Delete key is pressed, the character where the cursor is located will be removed from the field. All characters to the right of the cursor will be moved one character to the left. The Delete key works only in "Edit" mode (see F2). |
| Caps Lock | This is a switch that turns Caps Lock mode on and off (see display on lower right side of screen). |
| Num Lock | This is a switch that changes the mode of the numeric keyboard. When the Num Lock key is on, the numeric keypad functions as a calculator (i.e., the keys are for numbers). When Num Lock is off, the numeric keypad allows use of the navigate functions (e.g., Up-Arrow, Down-Arrow, etc). To use the system navigation features on the numeric keyboard, the Num Lock is normally off. (Alternately, the Num Lock can be on and the Shift key can be pressed simultaneously with the system navigation keys). |
| F1 | Help! Pressing F1 will provide detailed help instructions for each system field. For many fields, Help has multiple levels. By pressing F1 multiple times, additional Help information is displayed for those fields. |

USING THE SYSTEM

| | |
|---|---|
| Right-Arrow | This will move the cursor one field to the right on the screen. |
| Ctrl + Left-Arrow | This will move the cursor to the left-most field on the screen. |
| Ctrl + Right-Arrow | This will move the cursor to the right-most field on the screen. |
| PgDn | Page-Down will cause the system to display the next page of information (it is only operational on those screens that indicate "Page xx of yy"). |
| PgUp | Page-Up will cause the system to display the previous page of information (it is only operational on those screens that indicate "Page xx of yy"). |
| Ctrl + PgDn | This will cause the cursor to move to the top of the last page (this is only operational on selected screens where "Page xx of yy" is displayed). |
| Ctrl + PgUp | This will cause the cursor to move to the top of the first page (this is only operational on those screens where "Page xx of yy" is displayed). |
| Home | This will move the cursor to the top of the current screen. |
| End | This will move the cursor to the bottom of the current screen. |
| Ins | This is a switch that turns "Insert" mode on and off (see display at lower right of screen). When "Insert" mode is on, the system will automatically insert any characters keyed into a field where the cursor is located. All characters to the right are shifted to the right accordingly. The Insert key works only when the system is in "Edit" mode (see F2). |

The Keyboard

The following list describes each key and its purpose. Read the list briefly now, and refer back to it as needed when you are using the system.

| | |
|---|---|
| Letters, Numbers and Special Character | Most of the data keyed will use letters ("A", "B", "C", etc.), numbers ("1", "2", "3", etc.) and on occasion special characters ("S", "&", "#", etc). |
| Backspace | If you wish to move the cursor backwards (to the left) in a field that has been keyed in error, a backspace key is provided. This is the key with the arrow pointing to the left. It is on the upper right side of the section of the keyboard with letters/numbers. It should not be confused with the Left-Arrow key on the numeric keypad. |
| Enter | The large key on the right side of the alphabetical area of your keyboard is called the "Enter" key. Pressing Enter will cause the system to move to the next logical field. |
| Esc | This is the Escape key. It instructs the system to abort the current function. Pressing the Escape key will cause the system to abort any changes made to the current field or screen. When in doubt, press ESC until you are on a screen you understand. |
| Up-Arrow | This will move the cursor up one line on a screen. |
| Down-Arrow | This will move the cursor down one line on a screen. |
| Left-Arrow | This will move the cursor one field to the left on the screen. |

USING THE SYSTEM

| | |
|---|---|
| Drive/Directory | This is the current disk drive ID and DOS directory. |
| Mode Designations | This displays which modes are currently active. The possible mode selections are: |

- CAPS (Caps lock)
- EDIT (Change information in a existing field)
- INS (Insert characters in an existing field)

The last line of each screen includes the following:

| | |
|---|---|
| Active Function Keys | This lists the active function keys. The function key designations displayed will change depending upon which function is currently being accessed. |

APPLAUD utilizes a state-of-the-art multi-windowing technology. System command alternatives and error messages are displayed in dynamic windows.

The Main System Menu is shown below.

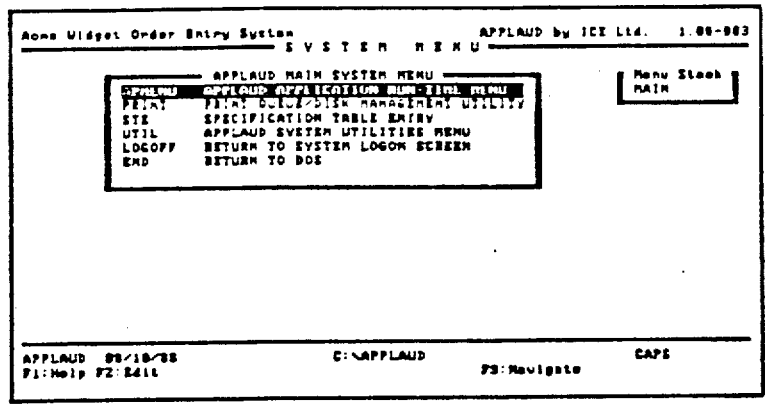

Main System Menu Screen

USING THE SYSTEM

The next few pages provide general information about how APPLAUD looks and how it uses special keys.

The Screen

APPLAUD displays some information consistently on every screen. The first line of each screen includes the following:

| | |
|---|---|
| The company /System name | APPLAUD displays a user-specified company name at the top of each screen. This field is currently blank. APPLAUD utilities allow you to easily change this to your company's name, your client's company name, or any system name that you desire. See "TBL" in Section 6 for more information. |
| APPLAUD by ICE, Ltd. | This identifies the APPLAUD system. |
| 1.00-000 | This is the software release ID and the number of Compile runs. The Compile run number is incremented each time APPLAUD Applications are Compiled. |

The next to the last line of the screen includes the following:

| | |
|---|---|
| APPLAUD | This is the current user ID. |
| XX/XX/XX | This is the current date. Note that APPLAUD has the ability to automatically change the handling of all date fields to Canadian/European/Australian format or to U.S. format. For Canadian/European/Australian users, data entry of dates can be optionally modified to day-month-year format. See Appendix A for more information on the date format. |

RESTORING FILES

If you ever need to restore APPLAUD files from back-up, perform the following steps:

1. Re-install APPLAUD using the standard installation steps.

2. Apply all software upgrades that have been provided since your original installation.

3. Restore the back-up files to the directory.

NOTE: If you only want to restore the files, you only need to perform step 3 above.

BACKING-UP YOUR FILES

As you use APPLAUD, you will modify system files. You will enter APPLAUD tables into the system and ultimately create a Data Base for your Application. During this process, you will invest a precious commodity...your time.

Following the development process you will use the APPLAUD tables to build and update Data Bases. This will be a further investment in time.

During this process, it is possible that you make an error that causes your data base to become corrupted. This could be caused by improper processing, data entry errors, invalid calculation, duplicate processing, etc. Although very unlikely, it is also possible for your PC to have a hardware problem that would cause you to not be able to access a part or all of your data. If you do not have a back-up copy of your data base and any of these problems occur, you would be forced to re-invest your time and repeat the process.

*It is prudent to periodically back-up your Data Base to insure that you have a second copy in the event of a crisis!* Back-up should be performed on a regular basis.

Back-up can be accomplished by copying the APPLAUD system files to diskette, to tape, to another disk or by other means. Refer to the manuals that came with your hardware for back-up instructions.

When backing-up APPLAUD files, at a minimum, you should save the following:

| | |
|---|---|
| AP*.FIL | These are the APPLAUD Master Files. |
| AP*.PRE | These are pre-image files that do not exist under normal circumstances (see Appendix D, "APPLAUD FILES," for more information on pre-image files). |
| *.AP | These are the Compiled APPLAUD Application files. |

BRINGING THE SYSTEM DOWN

You can exit APPLAUD and return to DOS in one of the following ways:

- Select "END" at any system menu.

OR

- Key "END" in the user ID field on the System Logon screen.

Also, you can return to the System Logon Screen from anywhere in APPLAUD by selecting "LOGOFF" at any APPLAUD system menu.

"APPLAUD" is set up as both the user ID and the password when you first use the system. You can change these codes and assign new ones at any time. See Section 6 for more information on user IDs, passwords, and data security.

A Copyright screen is displayed for a few seconds, followed by the APPLAUD Main System Menu. The Main System menu is shown below.

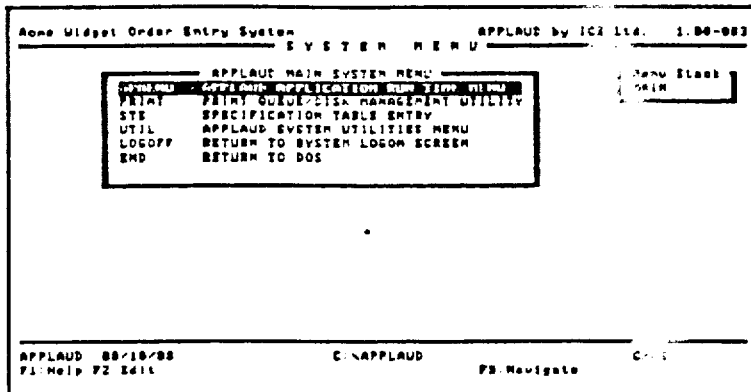

Main System Menu Screen

4. Key "APPLAUD" and press Enter.

This will bring up the system logon screen. The *cursor* (a flashing box), is waiting for your entry at the "USER" field. This is where you identify yourself as the system user. The logon screen is shown below.

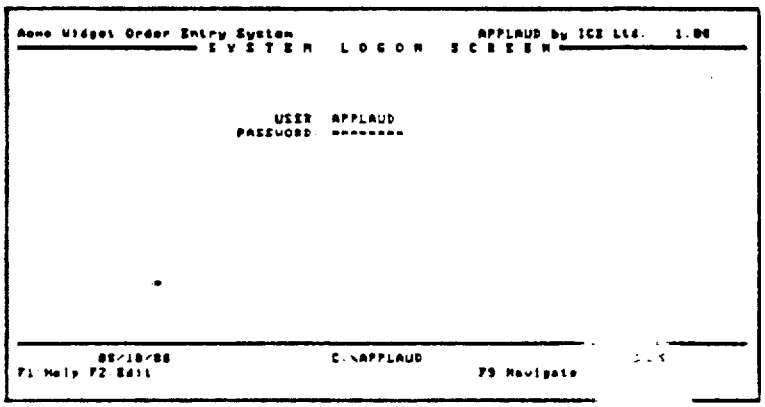

System Logon Screen

NOTE: If you have a monochrome monitor and the scr    ,ears difficult to read, hold down Alt and press F10. This wi:    , the display mode to monochrome.

Now identify yourself to APPLAUD's security feature.         UD has been distributed to you with the user ID "APPLAUL .

5. Key "APPLAUD" in capital letters and           ter.

This will identify the user "APPLAUD" to     system.

NOTE: If you key your user ID incorrec              ys a warning message. Key the correct code NOTE: You can return to DOS by keyi:              apt.

6. Key "APPLAUD" again and

This is the password assigned to the user "APPL          that as you key the password, it does not display on the NOTE: If you key your password incorrectly, AF         isplays a warning message. Key the correct code and pre

BRINGING UP APPLAUD

Once APPLAUD is installed on your hard disk, you can bring up the system. Follow the steps below to begin each APPLAUD work session.

1. Key "C:" and press Enter.

This will make sure that you are on the drive where APPLAUD resides.

NOTE: If you have installed APPLAUD on another drive (e.g., Drive D, E, F, etc.) enter the proper letter for your drive.

2. Key "CD \APPLAUD" and press Enter.

This will make sure that you are in the APPLAUD directory.

3. Key "ICEP" and press Enter.

This will bring up the DOS PRINT spooler.

NOTE: You *must* perform this step if you plan to use the APPLAUD Print Queue Management feature. If you do not plan to use the APPLAUD built-in print facilities, you can skip this step.

ALSO NOTE: If the DOS print facility is already resident, this will display several harmless error messages.

INSTALLING APPLAUD

To install APPLAUD on your computer, you need the "Base System" diskettes provided with this manual. The installation instructions below show you how to create a directory on your hard disk and load the "Base System" diskettes into the directory. Follow the steps below. *Load only the "Base System" diskettes at this time.*

NOTE: Keystrokes are enclosed in quotation marks. Do not type the quotation marks, just the characters they enclose. Key the characters exactly as you see them in the instructions.

1. Key "C:" and press Enter.

This will make Drive C the "current" drive. NOTE: Modify this command if you are using Drive D, E, etc.

2. Key "CD\" and press Enter.

Make sure that you key a backslash "\" and not a forward slash, "/". This will make the system "change" to the root directory.

3. Key "MD \APPLAUD" and press Enter.

This will create a new directory on the PC called "APPLAUD".

4. Key "CD \APPLAUD" and press Enter.

This will "change" to the new "APPLAUD" directory.

5. Place the first "Base System" APPLAUD diskette in Drive A: and close the door. Type "COPY A:*.*" and press Enter.

This will copy the contents of the diskette to the hard disk. The DOS prompt appears when the copy is complete.

6. Repeat Step 5 for each "Base System" diskette.

After you have copied *all* "Base System" diskettes, the installation is complete. Once APPLAUD is installed, there is no need to ever repeat these steps again.

7. Key "APINST" and press Enter.

This program will provide further directions if any additional steps are required to run APPLAUD on your system.

SYSTEM REQUIREMENTS

APPLAUD requires the following hardware and software:

- An IBM PC, AT, PS/2 or 100% plug-compatible computer

- At least 640K memory, with at least 585K available to APPLAUD

NOTE: If *less* than 585K is available for APPLAUD, the system may display a message such as "Memory Not Available" or "Insufficient Memory"

- At least one diskette drive

- Enough hard disk space to store and work with the Applications you create (plus 3 megabytes for the APPLAUD software)

- A color or monochrome monitor (APPLAUD runs in color on a color monitor)

- A printer (optional)

- PC DOS (or MS DOS) (Version 3.0 or higher is required in order to use the system resident Print Queue Management feature)

SECTION OVERVIEW

This section presents step-by-step instructions for installing the APPLAUD software on your computer and bringing up the system.

NOTE: The next few pages of this manual assume that you are familiar with DOS and with your PC hardware. These instructions do not describe DOS commands in detail, nor do they explain operation of diskette drives, CRT screens, or other system components. If you are not familiar with DOS and the PC, ask for guidance as you go through the installation process.

APPENDIX D, APPLAUD FILES, lists all APPLAUD files and explains how they are used.

The INDEX contains an alphabetical listing of topics and page references.

*ABOUT THIS MANUAL*

ABOUT THIS MANUAL

This Reference Manual contains the following sections:

SECTION 1, GETTING STARTED, gives instructions for installing the system and running it on your PC. It also describes menu and screen format and how to use special keys.

SECTION 2, DEVELOPING AN APPLICATION, gives an overview of the kinds of tables and describes how you combine them into an application. Read this section before you begin working in the Specification Table Entry (STE) part of the APPLAUD system.

SECTION 3, SPECIFICATION TABLE ENTRY - STE, is a reference section. It provides a detailed description of each STE table type. Each description includes a summary and sub-sections illustrating screen access, special key use, and field descriptions for all screens.

SECTION 4, COMPILE STE TABLES - CMP, describes how to prepare STE application tables for run-time operation.

SECTION 5, RUNNING APPLAUD APPLICATIONS, describes how to complete run-time screens so that your application produces the results you want.

SECTION 6, APPLAUD SYSTEM UTILITIES, summarizes the system utilities and provides a complete description of each table. The table descriptions in this section follow the same format used in Section 3.

APPENDIX A, DATA FORMATS, lists accepted data formats for APPLAUD Data Elements.

APPENDIX B, MESSAGES, lists all system-generated messages, with an explanation for each.

APPENDIX C, RUNNING APPLAUD IN MORE THAN ONE DIRECTORY, tells you how to set up your PC to efficiently run APPLAUD in more than one directory.

1 - GETTING STARTED

APPLAUD MANUALS OVERVIEW

Welcome to APPLAUD! APPLAUD is revolutionary PC-based software that doesn't require programming. APPLAUD has the power to easily and quickly create sophisticated, dynamic PC computer applications.

And APPLAUD is easy-to-learn. APPLAUD's non-procedural (i.e., non-programming) approach and its many innovative productivity tools make it easy-to-use for non-technicians as well as technicians.

Also, APPLAUD's documentation provides new techniques that speed your understanding of the system. This includes:

1. Tutorial - This will instruct you in your initial use of APPLAUD. In the Tutorial you will run actual APPLAUD applications under the guidance of the Tutor.

2. Reference Manual - This is provided for reference purposes. It is organized to allow easy access to information on all APPLAUD features.

This APPLAUD Reference Manual is intended to be used after you have taken the APPLAUD Tutorial. In the APPLAUD Tutorial you actually run APPLAUD applications. APPLAUD's Tutorial is unique. It is not a simple mock-up of system screens. The Tutorial will quickly and painlessly guide you through your APPLAUD education. You are strongly advised to take the Tutorial lessons prior to proceeding with this manual.

BEST AVAILABLE COPY

TBL - TABLES FOR LOGON/MENUS/SCREEN
COLORS/ETC. .................6-10
    Menu Table Entry Screen ............6-13
    Print Menus Screen ...............6-16
    Company Name/Date Format Screen .......6-17
    Color Selection Screen .............6-18
File Drive ID's Screen ................6-21
RBLD - REBUILD ON-LINE INDEX ..........6-22

APPENDIX A - DATA FORMATS .............A-1

ALPHANUMERIC DATA ELEMENTS .........A-2
    NUMERIC DATA ELEMENTS .............A-3
    DATE DATA ELEMENTS ...............A-5

APPENDIX B - MESSAGES .................B-1

COMPILER MESSAGES ................B-2
    ON-LINE DATA ENTRY ERROR MESSAGES .....B-50
    EXCEPTION REPORT ERROR MESSAGES .....B-52
    IMPORT FILE DEFINITION ERROR MESSAGES ...B-53
    RUN-TIME DATA EXCEPTION MESSAGES ......B-55

APPENDIX C - RUNNING APPLAUD IN MORE THAN ONE SUB-DIRECTORY ......................C-1

APPENDIX D - APPLAUD FILES .............D-1

INDEX ...................................I-1

```
    SEARCH FOR LABEL COMMAND  . . . . . . . . . .  3-9
    SEQUENCE OF TABLE ENTRY  . . . . . . . . . .  3-10
    TABLE NAMING CONVENTIONS . . . . . . . . . .  3-11
    FORMAT OF THIS SECTION . . . . . . . . . . .  3-12
    DD - DATA DICTIONARY  . . . . . . . . . . . .  3-15
    DB - DATA BASE SPECIFICATION . . . . . . . .  3-21
    AP - APPLICATION CONTROL DEFINITION  . . . .  3-27
    IF - IMPORT FILE DEFINITION . . . . . . . . .  3-39
    OL - ON-LINE DATA ENTRY/INQUIRY  . . . . . .  3-57
    CS - CALCULATION SPECIFICATION  . . . . . .  3-67
    TL - TABLE-LOOK-UP DEFINITION . . . . . . . .  3-85
    ES - EXTERNAL SUBROUTINE SPECIFICATION . .  3-91
    CR - COLUMNAR REPORT . . . . . . . . . . . .  3-95
    DR - DETAIL REPORT  . . . . . . . . . . . . .  3-105
    ER - EXCEPTION REPORT . . . . . . . . . . .  3-115
    FR - FREE FORM REPORT  . . . . . . . . . . .  3-121
    MR - MATRIX REPORT . . . . . . . . . . . . .  3-133
    EF - EXPORT FILE  . . . . . . . . . . . . . .  3-145
```

4 - COMPILING APPLAUD TABLES - CMP . . . . . 4-1

```
    OVERVIEW . . . . . . . . . . . . . . . . . . .  4-1
    COMPILE SCREEN . . . . . . . . . . . . . . .  4-2
```

5 - RUNNING APPLAUD APPLICATIONS . . . . . . 5-1

```
    OVERVIEW . . . . . . . . . . . . . . . . . . .  5-1
    APMENU  . . . . . . . . . . . . . . . . . . .  5-2
    RUN-TIME SELECTION OPTIONS FOR
    IMPORT/EXPORT/REPORT APPLICATIONS  . . . .  5-4
    TABLE-SPECIFIC PROMPTS . . . . . . . . . . .  5-8
    RUNNING THE APPLICATION . . . . . . . . . .  5-12
    RUNNING ON-LINE APPLICATIONS . . . . . . . .  5-14
```

6 - APPLAUD SYSTEM UTILITIES . . . . . . . . . . . . 6-1

```
    OVERVIEW . . . . . . . . . . . . . . . . . . .  6-1
    SYSTEM UTILITIES MENU . . . . . . . . . . . .  6-2
    PRINT - PRINT DATA MANAGEMENT UTILITY  . . .  6-3
    TLE - ON-LINE TABLE LOOK-UP ENTRY  . . . . .  6-8
```

BEST AVAILABLE COPY

Table of Contents

1 - GETTING STARTED .........................1-1

APPLAUD MANUALS OVERVIEW ............1-1
    ABOUT THIS MANUAL ...................1-2
    SECTION OVERVIEW ....................1-4
    SYSTEM REQUIREMENTS ................1-5
    INSTALLING APPLAUD ..................1-6
    BRINGING UP APPLAUD ................1-7
    BRINGING THE SYSTEM DOWN ..........1-10
    BACKING-UP YOUR FILES ..............1-11
    RESTORING FILES ....................1-12
    USING THE SYSTEM ..................1-13
    APPLAUD Menus ......................1-20
    THE COMMAND BOX ..................1-22
    DATA ENTRY CONVENTIONS ............1-25
    APPLAUD REPORT CONVENTIONS ........1-26

2 - APPLICATION DEVELOPMENT .........2-1

SECTION OVERVIEW ...................2-1
    WHAT GOES INTO DEVELOPING AN APPLICATION? 2-2
    DATA DEFINITION TABLES .............2-5
    APPLICATION CONTROL TABLE ..........2-7
    INPUT/UPDATE TABLES ................2-8
    PROCESSING TABLES .................2-9
    REPORTS/OUTPUT TABLES ............2-10
    APPLAUD UTILITIES ..................2-11
    APPLICATION DESIGN GUIDELINES ......2-13
    APPLAUD'S LIMITS ..................2-18
    DATA BASE INTEGRITY CAUTIONS ......2-19

3 - SPECIFICATION TABLE ENTRY ......3-1

OVERVIEW ...........................3-1
    HELP ...............................3-3
    TABLE COMMANDS ....................3-6
    LINE COMMANDS .....................3-7

EXHIBIT B

APPLAUD TABLE TYPES

DD—Data Dictionary—This table defines all Data Elements used within the APPLAUD Application Package. One Data Dictionary table is required for each Data Element. It indicates the size, format, and edit rules of the Data Element. It also specifies the desire display format for each field.

DB—Data Base Definition—This table defines each Data Base to be used by the APPLAUD Application Package. The Data Base definition table lists all Data Elements that are included within each Data Base.

AP—Application Control—This table lists a set of Function Tables for APPLAUD to perform when the Application runs. An AP (Application Control) table also specifies the DB (Data Base) table to be processed. Each AP (Application Control) table is automatically added to the APPLAUD Run-Time Application Menu.

IF—Import File Definition—APPLAUD's import file facility brings in files from external sources. These files can be from mainframe systems and mini-computer systems as well as from micro-computer systems. The files can contain packed and binary data as well as display character data. They can be in ASCII or EBCDIC format.

OL—On-Line Data Entry/Inquiry—This table provides the ability to define on-line screens within APPLAUD. These screens can be used for update or can be limited to "inquiry-only" activities.

CS—Calculation Specification—This table provides a programming language within APPLAUD. It provides mathematical calculations as well as logical comparisons. The calculation Specification Section of APPLAUD allows a programmer to do anything that can be done in third-generation programming languages. It also contains sophisticated techniques that reduce the time required to develop complex calculation algorithms.

TL—Table Look-Up—This table provides the ability to crate look-up tables that can perform Data Element edits to determine if fields contain valid values. Second, it provides an easy to use method of data encoding. This allows the user to translate entered codes into full descriptions on reports.

ES—External Subroutine—This table provides the ability to call external COBOL subroutines. Existing subroutines can be executed without recoding them.

CR—Columnar Report—This is a versatile report generator that produces columnar-style reports. The reports are dynamic, based on run-time parameters for sequence and totaling logic.

DR—Detail Report—This table defines detail-style reports that allow easy access to large volumes of data.

ER—Exception Report—This table provides the ability to easily define exception reports. These reports quickly identify those records within the Data Base that do not conform to specified edit rules (for example, above or below a limit, blank, not an allowed code value, etc.). This is especially valuable for testing data for validity.

FR—Free-Form Report—This report provides the ability to easily define free-form reports. Data and text can be mixed and placed on the printed page in essentially any way. This feature can be used for many types of formats: pre-printed forms, letter or memo reports, mailing labels, etc.

EF—Export File—This table provides the ability to export data out of APPLAUD into another system. The data can be placed into essentially any format.

What is claimed is:

1. A computerized method of automatically generating end user documentation describing an application package which includes one or more application programs, the package being implemented using a high level computer language with the application package defined, at least in part by a prestored application definition file containing predefined specifications for the application programs, the method comprising the steps of:

providing the application definition file;

providing a prestored set of commands and text which together define, at least in part, the user documentation wherein at least some of said commands are associated with different aspects of said user documentation;

accessing the prestored set of commands and text;

executing said accessed commands including said at least some of said commands;

based upon each said executed command, automatically analyzing the predefined specifications to locate information required by at least some of said executed commands in the application definition file;

deriving sequences of information required by at least some of said executed commands regarding the application programs and combining the derived information with at least some of the accessed text; and generating a document output stream of text representative of the end user documentation including documentation for at least some of said application programs.

2. A method as in claim 1 including:
providing an output file;
storing the document output stream in the output file; and
printing the user documentation from the contents of the output file.

3. A method as in claim 1 including:
providing an output file;
storing the document output stream in the output file; and
displaying the user documentation from the contents of the output file.

4. A computerized method as in claim 1 including in the analyzing step:
determining if the application definition file includes one or more run-time prompts; and
including in the output stream a representation of the run-time prompts.

5. A computerized method as in claim 1 including in the analyzing step:

determining if the application definition file defines one or more reports; and including in the output stream a representation of the reports.

6. A computerized method as in claim 1 including in the analyzing step:

determining if the application definition file defines one or more on-line screens; and including in the output stream a representation of the screens.

7. A computerized method as in claim 1 wherein the application definition file includes one or more application defining tables and with the analyzing step including analyzing the application defining tables.

* * * * *